United States Patent
Rose

(10) Patent No.: US 11,005,841 B1
(45) Date of Patent: *May 11, 2021

(54) BIOMETRIC AUTHENTICATION, DECENTRALIZED LEARNING FRAMEWORK, AND ADAPTIVE SECURITY PROTOCOLS IN DISTRIBUTED TERMINAL NETWORK

(71) Applicant: Evan Chase Rose, San Juan, PR (US)

(72) Inventor: Evan Chase Rose, San Juan, PR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/882,993

(22) Filed: May 26, 2020

Related U.S. Application Data

(63) Continuation of application No. 16/802,536, filed on Feb. 26, 2020.

(60) Provisional application No. 62/975,006, filed on Feb. 11, 2020, provisional application No. 62/972,025, filed on Feb. 9, 2020, provisional application No. 62/958,572, filed on Jan. 8, 2020, provisional application No. 62/954,451, filed on Dec. 28, 2019, provisional application No. 62/952,408, filed on Dec. 22, 2019, provisional application No. 62/945,577, filed on Dec. 9, 2019.

(51) Int. Cl.
*H04L 29/06* (2006.01)

(52) U.S. Cl.
CPC ...... *H04L 63/0861* (2013.01); *H04L 63/0428* (2013.01)

(58) Field of Classification Search
CPC . H04L 63/0861; H04L 63/0428; H04N 5/225; G06Q 20/40145; G06Q 20/389; G06Q 20/40; G06Q 20/4012; G06Q 20/4014
See application file for complete search history.

(56) References Cited

U.S. PATENT DOCUMENTS

| | | | |
|---|---|---|---|
| 6,801,508 B1 * | 10/2004 | Lim | H04L 12/5601 370/310.1 |
| 7,688,742 B2 * | 3/2010 | Sridhar | H04L 12/2881 370/241.1 |
| 9,077,695 B2 | 7/2015 | Larson | |
| 9,331,906 B1 * | 5/2016 | McMullan | H04L 12/6418 |
| 9,374,346 B2 | 6/2016 | Larson | |
| 10,116,630 B2 | 10/2018 | Caragea | |

(Continued)

*Primary Examiner* — Abu S Sholeman

(57) ABSTRACT

Biometric authentication, decentralized learning frameworks, and adaptive security protocols and services for a distributed operator terminals network are described. In some embodiments, the terminals may be hardware terminals, kiosks, or clients. In some embodiments, a security analysis may be performed, and security scores may be determined, for visitors requesting operations at terminals. Security scores may be determined by a vendor, in communication with the operator terminals, based on aggregation of a plurality of factors, wherein each factor may be weighted. The factors may incorporate operator settings or preferences. In one embodiment, the factors include one or more facial recognition factors. The one or more facial recognition factors may be used for biometric authentication. The vendor may use the security scores to determine user privileges or permissions for the operations. The vendor may deliver instructions or messages to the terminals based on the determinations.

20 Claims, 14 Drawing Sheets

(56) References Cited

U.S. PATENT DOCUMENTS

| | | | |
|---|---|---|---|
| 2005/0147102 A1* | 7/2005 | Tai | H04L 12/2801 |
| | | | 370/395.2 |
| 2006/0168270 A1* | 7/2006 | Townsley | H04L 69/324 |
| | | | 709/230 |
| 2008/0015986 A1* | 1/2008 | Wright | G06Q 20/40 |
| | | | 705/44 |
| 2010/0107228 A1* | 4/2010 | Lin | H04L 63/083 |
| | | | 726/5 |
| 2010/0174900 A1* | 7/2010 | Lin | H04L 67/02 |
| | | | 713/155 |
| 2013/0197968 A1* | 8/2013 | Davis | G06Q 30/0201 |
| | | | 705/7.29 |
| 2015/0172919 A1 | 6/2015 | Basnayake | |
| 2017/0255937 A1 | 9/2017 | Maddukuri | |
| 2017/0352037 A1* | 12/2017 | Wu | G06Q 20/40145 |
| 2019/0147440 A1 | 5/2019 | Deliwala | |
| 2019/0349770 A1 | 11/2019 | Andres | |
| 2020/0106770 A1* | 4/2020 | Surendran | G06F 21/32 |

* cited by examiner

BIOMETRIC AUTHENTICATION, DECENTRALIZED LEARNING FRAMEWORK, AND ADAPTIVE SECURITY PROTOCOLS IN DISTRIBUTED TERMINAL NETWORK

CROSS REFERENCE TO RELATED APPLICATIONS

This application is a Continuation of application Ser. No. 16/802,536, filed on Feb. 26, 2020.

This application claims the benefit of each of U.S. Provisional Application Ser. No. 62/945,577 filed on Dec. 9, 2019, U.S. Provisional Application Ser. No. 62/952,408 filed Dec. 22, 2019, U.S. Provisional Application Ser. No. 62/954,451 filed Dec. 28, 2019, U.S. Provisional Application Ser. No. 62/958,572 filed Jan. 8, 2020, U.S. Provisional Application Ser. No. 62/972,025 filed Feb. 9, 2020, and U.S. Provisional Application Ser. No. 62/975,006 filed Feb. 11, 2020, the contents of each of listed U.S. Provisional Application expressly incorporated by reference herein and each in entirety.

TECHNICAL FIELD

This invention relates generally to terminals, and more specifically, to security for a distributed network of terminals using methods such as, for example, biometric authentication and decentralized learning. Terminals may, in one example, be hardware terminals such as vending machine networks or kiosk networks.

BACKGROUND

Distributed terminal networks are becoming more prevalent. Accordingly, there is a growing need for efficient and secure distributed terminal systems, such as to protect against emerging security risks. Current systems and methods do not possess a structure or configuration that provides as quick or robust security as provided herein. For example, current systems and methods do not leverage such a combination of factors as described herein. Current systems and methods are not as quick or adaptive as the embodiments provided herein. For example, current systems and methods do not provide a hardware-service configuration and workflow that allows for quick and robust deployment of security features, reinstatement and storage of machine states, etc. Further, current systems and methods are not easily updated and new advancements in security are not easily leveraged or implemented in current systems and methods.

SUMMARY

Embodiments include a method, system, and computer program product for performing operations at distributed terminals. In accordance with one or more embodiments, a computer implemented method may include identifying at least one factor for the user at the first terminal. The factor may include, for example, a biometric factor such as facial recognition factor. The method may further include determining a trust score for the user based on the factor, determining a relationship between the trust score and a threshold score, and determining that the trust score exceeds the threshold score. In response to determining that the trust score exceeds the threshold score, the method may include processing an operation request.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Some examples of the advantages of the presented technology include speed, efficiency, and security over present systems. In one example, by carrying out given security protocols by a software service provider in the presented technology, modifications to the protocols to adapt to emerging needs can be rapidly implemented and deployed to some or all of the distributed network. In another example, the presented technology allows for operator tailoring of security preferences and protocols.

DETAILED DESCRIPTION

Figure 1:
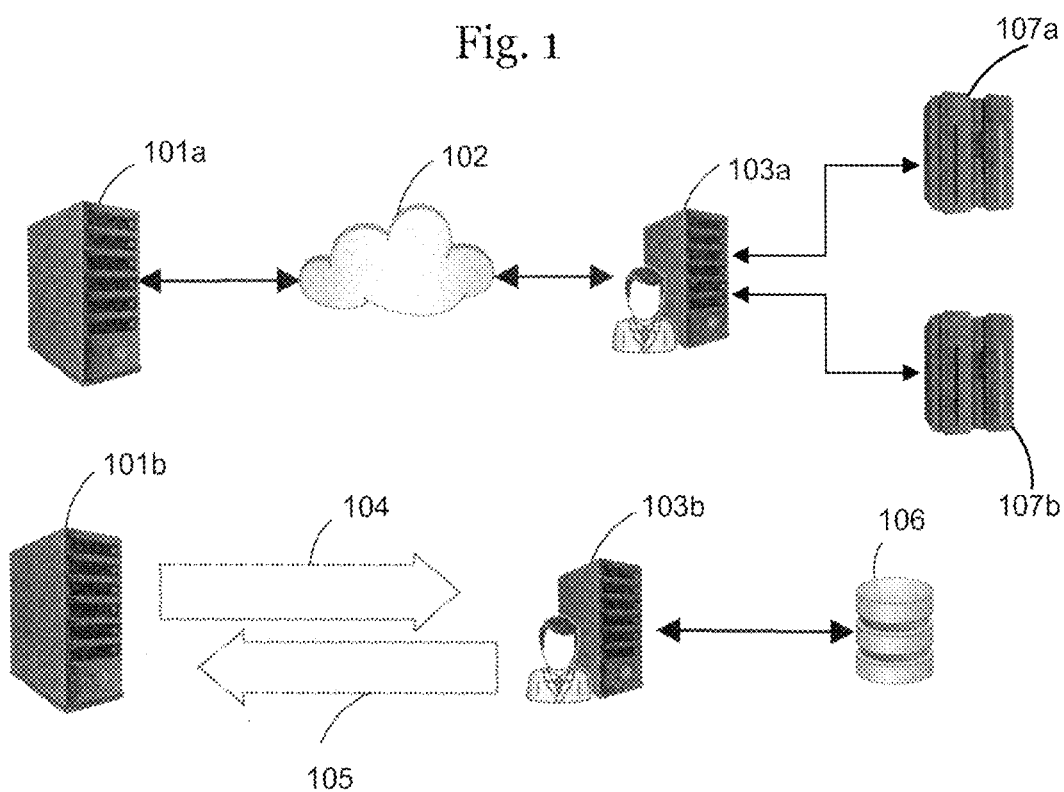
FIG. 1 is a diagram of a general network environment that can be used with terminals, hardware terminals, kiosks, nodes, or clients.

Distributed terminal networks are becoming more prevalent. Accordingly, there is a growing need for efficient and secure distributed terminal systems, such as to protect against emerging security risks.

Acronyms

API—Application Programming Interface
CNN—Convolutional Neural Network
FL—Federated Learning
HTTP/HTTPS—Hyper Text Transfer Protocol/Hyper Text Transfer Protocol Secure
KYT—Know-Your-Transaction
ML—Machine Learning
P2P—Peer-to-Peer
POS—Point-of-Sale
REST—Representational State Transfer
TLS/SSL—Transport Layer Security/Secure Sockets Layer
VPC—Virtual Private Cloud
VPN—Virtual Private Network

Terminology

Application Programming Interface

API technologies provide routines, protocols, and tools for building software applications and specifies how software components should interact.

Cloud Computing Cloud computing is a model that promotes ubiquitous, on-demand network access to shared computing.

Fog Computing

Horizontal system level architecture that distributes computing, storage, control and networking functions closer to the users along a cloud-to-thing continuum.

Public Keys and Private Keys

Public and private keys are created in pairs for each entity involved in a transmission and encrypt and decrypt information during the initial part of the transmission so that only the sender and recipient of the transmission can decrypt and read the information. Public key is available to everyone while the private key is known only to the creator of the keys.

Point-of-Sale

A point-of-sale (POS) may be any interface, device, node, or location that allows for a transaction to occur. For example, a POS may be a device, such as a mobile phone, computer, ATM kiosk or terminal.

Infrastructure

In one embodiment, a cloud network of points-of-sale, nodes, devices, or terminals may be provided. Each POS may be capable of providing, interacting with, or transacting funds, such as fiat or cash, and virtual currency.

A virtual currency POS or terminal may be a hardware terminal that allows for the purchase, sale, or exchange of funds or fiat currency for cryptocurrency. An operator may purchase and/or provide POS or terminals at selected locations to allow customer access.

In one embodiment, member POS or terminals in a cloud network may interact with software services provided by a vendor, for example. The terminals may include special software and/or hardware capabilities to allow interaction with the vendor services. Additionally, the POS or terminals may include special software and/or hardware capabilities to allow virtual currency transactions.

A POS or terminal may or may not be configured to possess a static IP address. A static IP address may be whitelisted, for example, by software services of the vendor to perform particular actions, make particular requests, etc. The vendor may partially, or entirely, block IP addresses that are not whitelisted, or known, etc. The vendor may provide full, limited, or restricted privileges to IP addresses that are whitelisted, or known, etc. In one example, SSH privileges for vendor servers and the like may be blocked or restricted for all IP addresses except a selected set of known IP addresses.

POS or terminal peripherals may be controlled, for example, via javascript using ActiveX controls, or using compiled code to transmit messages directly over serial hardware connections.

Software Services

Described in this disclosure are various software services.

A software service may be delivered, or provided by, a third party service, or vendor. The third party service, for example, may be a software service of a vendor. The software service may be hosted at a vendor-owned location, a third party location, or a proxy location, for example.

Software services may utilize any combination of the below components, for example.

Transport Layer Security/Secure Sockets Layer (TLS/SSL)

Transport Layer Security/Secure Sockets Layer CLS/SSL) connections make use of public and private keys among parties when establishing a connection and secure almost all transmissions on the Internet, including emails, web browsing, logins, and financial transactions, ensuring that all data that passes between a web server and a browser remains private and secure.

X.509 certificates

X.509 certificates are digital certificates administered by certificate authorities that use the X.509 PKI standard to verify that a public key belongs to the user, computer, or service identity in the certificate and are used worldwide across public and private sectors.

X.509 Attribute Certificates

X.509 attribute certificates can encode attributes (such as name, date of birth, address, and unique identifier number), are attached cryptographically to the X.509 certificate, and are administered by attribute certificate authorities.

Hyper Text Transfer Protocol

It will be understood that the terms HTTP and HTTPS will be used interchangeably and that use of either term includes either alternative.

Representational State Transfer

Representational state transfer (REST) is a software architectural style that defines a set of constraints to be used for creating Web services. Web services that conform to the REST architectural style, called RESTful Web services, provide interoperability between computer systems on the Internet.

Virtual Private Networks

One element of a software service may be a Virtual Private Network (VPN). A VPN may establish a secure and private tunnel from a network, terminal, or device, for example to another network element such as a vendor service, for example.

Security Groups

One element of a software service may be a security group. A security group, rules may be defined that dictate the allowed inbound and/or outbound traffic to a server, for example. For example, a security rule may specify to allow SSH access, from a particular IP address, on a particular port or port range, and using a particular protocol, such as TCP.

Virtual Private Cloud One element of a software service may be a Virtual Private Cloud (VPC). A VPC allows isolation of shared cloud resources, for example. In one method, private IP subnets may be assigned to a VPC user that is accompanied by a VPN function or access that secures, by means of authentication and encryption, the user's VPC resources.

Queues

One element of a software service may be a processing queue. For example, the queue may be processed in a first-in-first-out (FIFO) or last-in-first-out (LIFO) order. The queue may collect several processes to be carried out.

Server Architecture

A software service may be hosted on elastic server architecture, in one example. In an elastic architecture, computing resources may be automatically increased or decreased to meet computing needs. Computing thresholds may be preset or configured. When a threshold is exceeded for example, additional computing resources may be allocated.

Serverless Architecture

In another example, a software service may be hosted using serverless architecture. In a serverless architecture, computing resources are allocated as necessary on a per-request basis. After the request is processed, the computing resources are unallocated, or returned.

Data Structures

Various data structures may be used in conjunction with the software services. For example, various data structures may be used alone, or in combination, to store customer data/metadata, transaction data, etc.

Some example data structures include arrays, stacks, queues, linked lists, trees, graphs, tries, and hash tables.

Software Services

A third party vendor or provider may provide virtual currency processing software services. Software may be installed on terminals or via backend/cloud servers, or both.

Other Terminology

Herein a "plurality" refers to "one or more" of an element and does not impose any requirement for more than one element.

A virtual asset is a digital representation of value that can be digitally traded, or transferred, and can be used for payment or investment purposes.

It will be understood that cryptocurrency can refer to any virtual or digital currency/asset, and vice versa. Examples include, but are not limited to, Bitcoin, Litecoin, Ethereum, and Bitcoin Cash, and Ripple.

Additionally, funds transfers between individuals or entities often rely on banks or agents as third parties to orchestrate the transfer. This requires the entities to hold accounts with the banks or otherwise do business with the agents.

Virtual currencies and/or cryptocurrencies have been introduced in recent years. One advantage of the use of virtual currency is that many third parties may be eliminated. This allows for elimination of some third party service fees, for example.

Virtual currency does not require a holding bank. Therefore, it is possible for a software provider to orchestrate the transfer of virtual currencies between two other parties via messaging instructions. Therefore, the software provider is not required to handle, possess, or act as the custodian of actual funds.

Various services may be pipelined, and executed in conjunction, in a non-blocking manner, for example.

FIG. 1 is a diagram of a general network environment that can be used with terminals or points-of-sale capable of virtual currency transactions. A terminal, 101a or 101b, for example, may be in communication through a network 102 with a backend service, 103a or 103b, hosted by a vendor, for example. The terminal may send requests 104 through the network 102 to the service 103a or 103b. The service may determine a response 105 using information and data from a datastore 106, for example. The response 105 may be sent to the terminal instructing certain actions, for example. The backend service may be in further communication with third party services, 107a or 107b, for example.

The terminals or points-of-sale may be hardware terminals capable of any transaction. For example, the terminals may be one or a combination of, for example, ATMs, virtual currency ATMs such as Bitcoin ATMs, product terminals capable of vending or dispensing a product. In one example the product may be a cannabis or cannabis-containing product, tobacco or tobacco-containing product. In some examples, the products may be regulated in some form. For example, the legal age of purchase of the product may be 18 years or greater in a sale location. In one example, a terminal may be a dispensing product that can accept cash or virtual currency for the purchase.

Figure 2A:
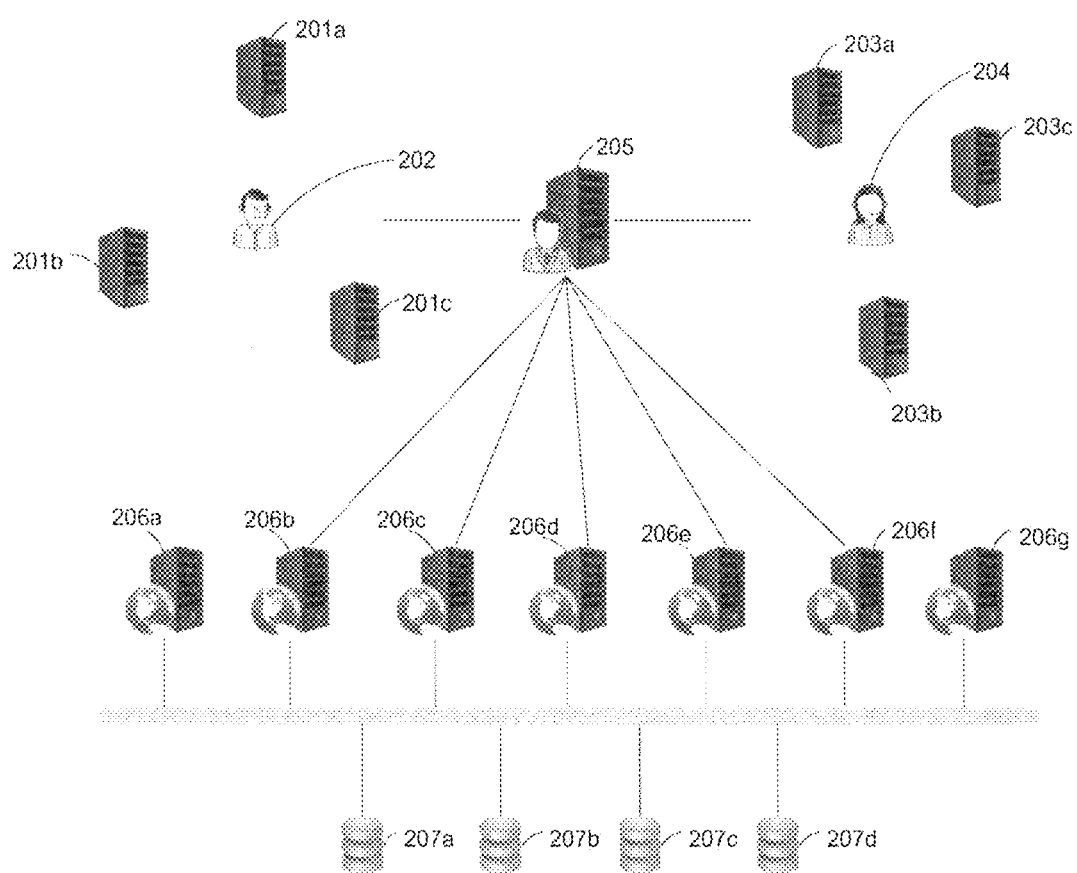
FIG. 2A is a diagram of a general network environment that can be used with terminals, hardware terminals, kiosks, nodes, or clients, serviced by a software service vendor.

FIG. 2A is a diagram of a general network environment that can be used with terminals or points-of-sale capable of virtual currency transactions serviced by a software service vendor. Various terminals (201a, 201b, 201c) may be operated or serviced by an operator 202, for example. Various other terminals (203a, 203b, 203c) may be operated or serviced by another operator 204, for example. The terminals may be in communication through a network with one or more software services provided by one or more vendors 205, for example. The vendor may provide various software services (206a-206g). The software services may be hosted together, or separately, for example. The software services may reference or use data from one or more datastores (207a-207d), for example.

Figure 2B:
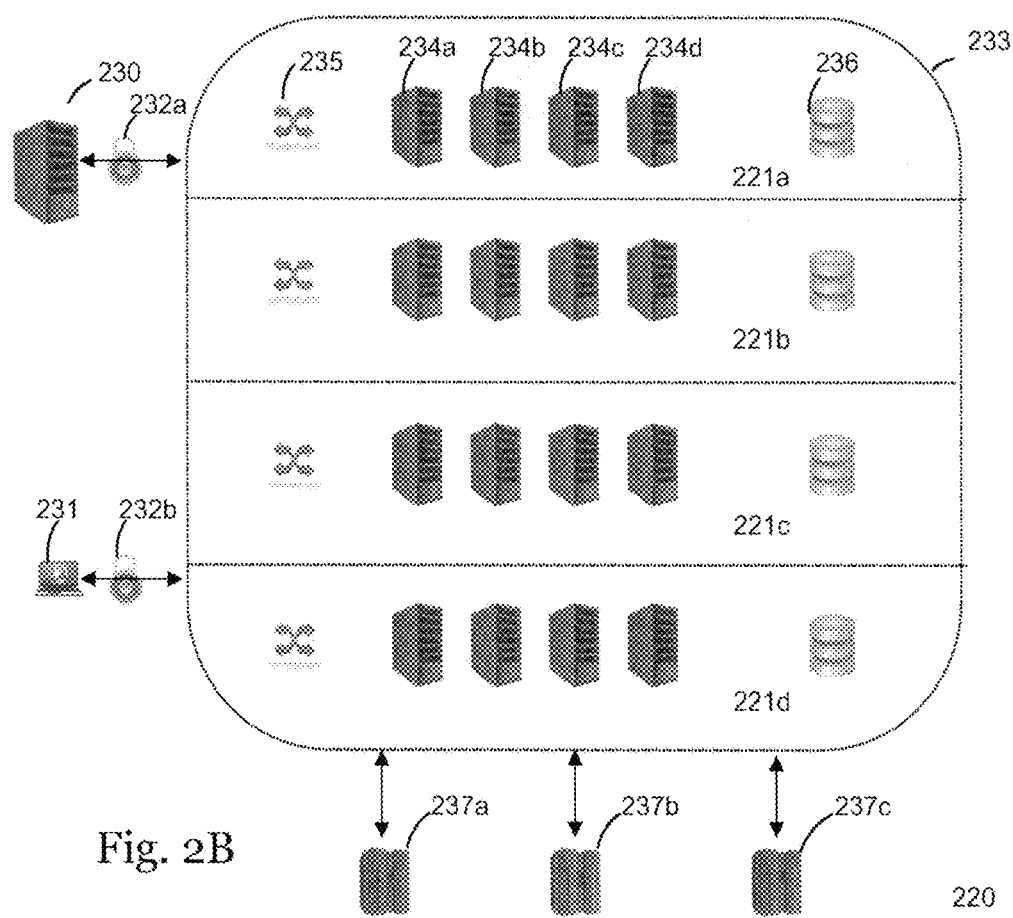
FIG. 2B. is a diagram of a network architecture environment that can be used with terminals, hardware terminals, kiosks, nodes, or clients, serviced by, for example, a software service vendor.

FIG. 2B. is a diagram of a network architecture environment that can be used with client nodes, terminals or points-of-sale capable of virtual currency transactions serviced by, for example, a software service vendor.

A client node, terminal, or point-of-sale 230 may access the software services of a vendor through a secure connection such as a VPN 232a. The terminal/point-of-sale and the VPN may each possess a static IP address or a dynamic IP address. The software service assets may be secured, for example behind a firewall or within a VPC 233. Connections to some or all of the services or microservices in the VPC may be configured to allow or disallow traffic from particular IP addresses or IP address ranges. For example, some services in the VPC may only allow inbound traffic from the IP address of the VPN service 232a.

The software services may be core software services and may include any number of microservices (221a-221d). Services and microservices may be segregated on different servers or may be devised in a shared server tenancy architecture. Each service or microservice may be balanced between one or more servers (234a-234d) via a load balancer 235 and may access one or more corresponding databases 236. Each service or microservice, for example 221a, may also be in communication with other services or microservices, for example 221b-221d, that are part of the system or VPC. Each service or microservice server may be devised in an elastic infrastructure with access to storage infrastructure such as database infrastructure 236. For example, a service or microservice server resource may automatically scale up, or allocated, upon increased demand for server resources beyond a certain threshold. Similarly, for example, a service or microservice server resource may automatically scale down, or unallocated, upon decreased demand for server resources at a certain threshold.

The servers for services and microservices may be segregated, or allocated, into different availability zones or failover regions.

The software services may prepare and process requests and responses to and from third party services (237a-237c).

An administrator 231 may access the software services through a secure connection such as a VPN 232b. The administrator machine(s) and the VPN may each possess a static IP address or a dynamic IP address. The software service assets may be secured, for example behind a firewall or within a VPC 233. Connections to some or all of the services or microservices in the VPC may be configured to allow or disallow traffic from particular IP addresses or IP address ranges. For example, some services in the VPC may only allow inbound traffic from the IP address of the VPN service 232b.

Figure 3:
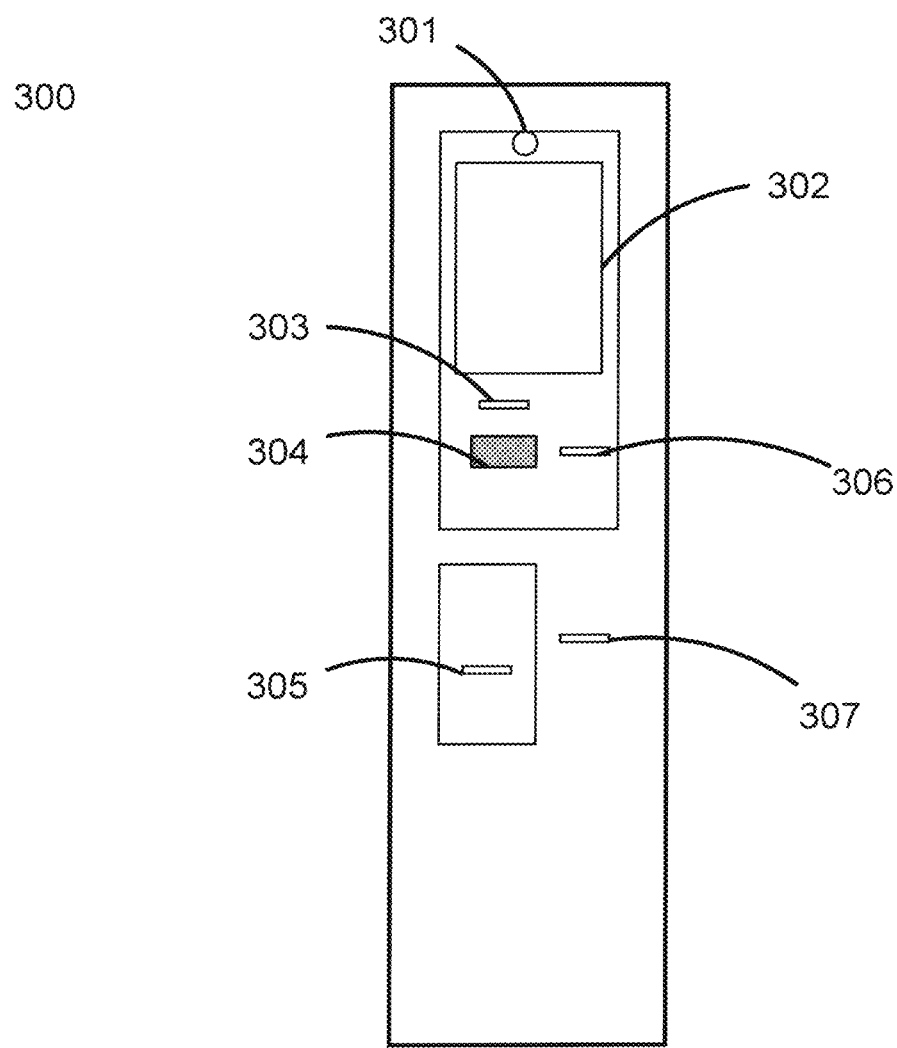
FIG. 3 is a diagram of a hardware terminal.

FIG. 3 is a diagram illustrating an example embodiment of a hardware terminal point-of-sale used in FIG. 1. More specifically, hardware terminal may include camera 301, screen 302, barcode reader 303, keypad 304, bill acceptor 305, card reader 306, and bill dispenser 307.

Figure 4:
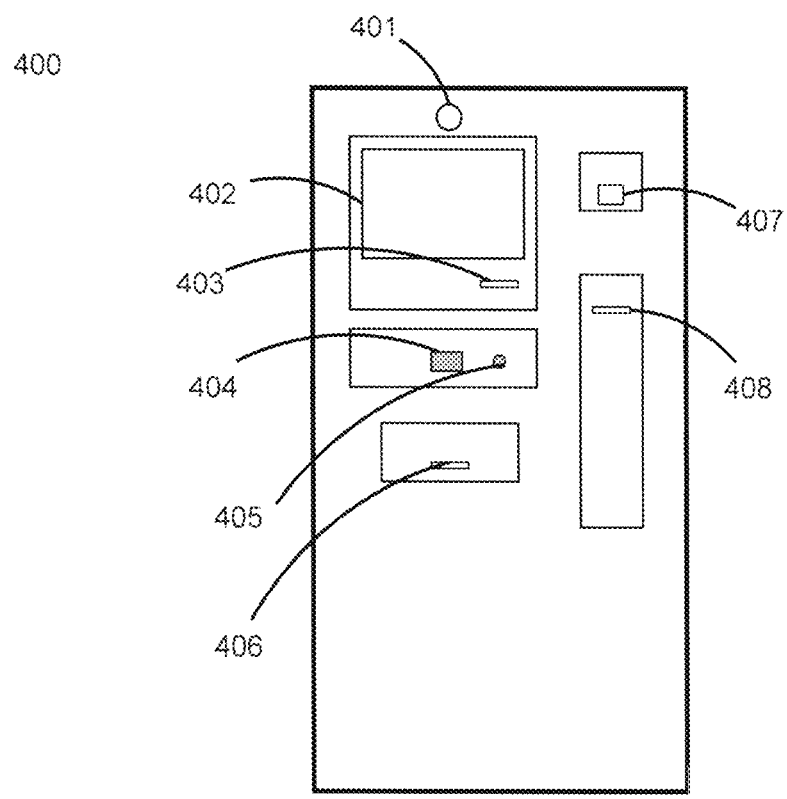
FIG. 4 is another diagram of a hardware terminal.

FIG. 4 is another diagram illustrating another example embodiment of a hardware terminal point-of-sale used in FIG. 1. More specifically, hardware terminal may include camera 401, screen 402, card reader 403, keypad 404, fingerprint reader 405, bill dispenser 406, card reader 407, and bill acceptor 408.

Figure 5:
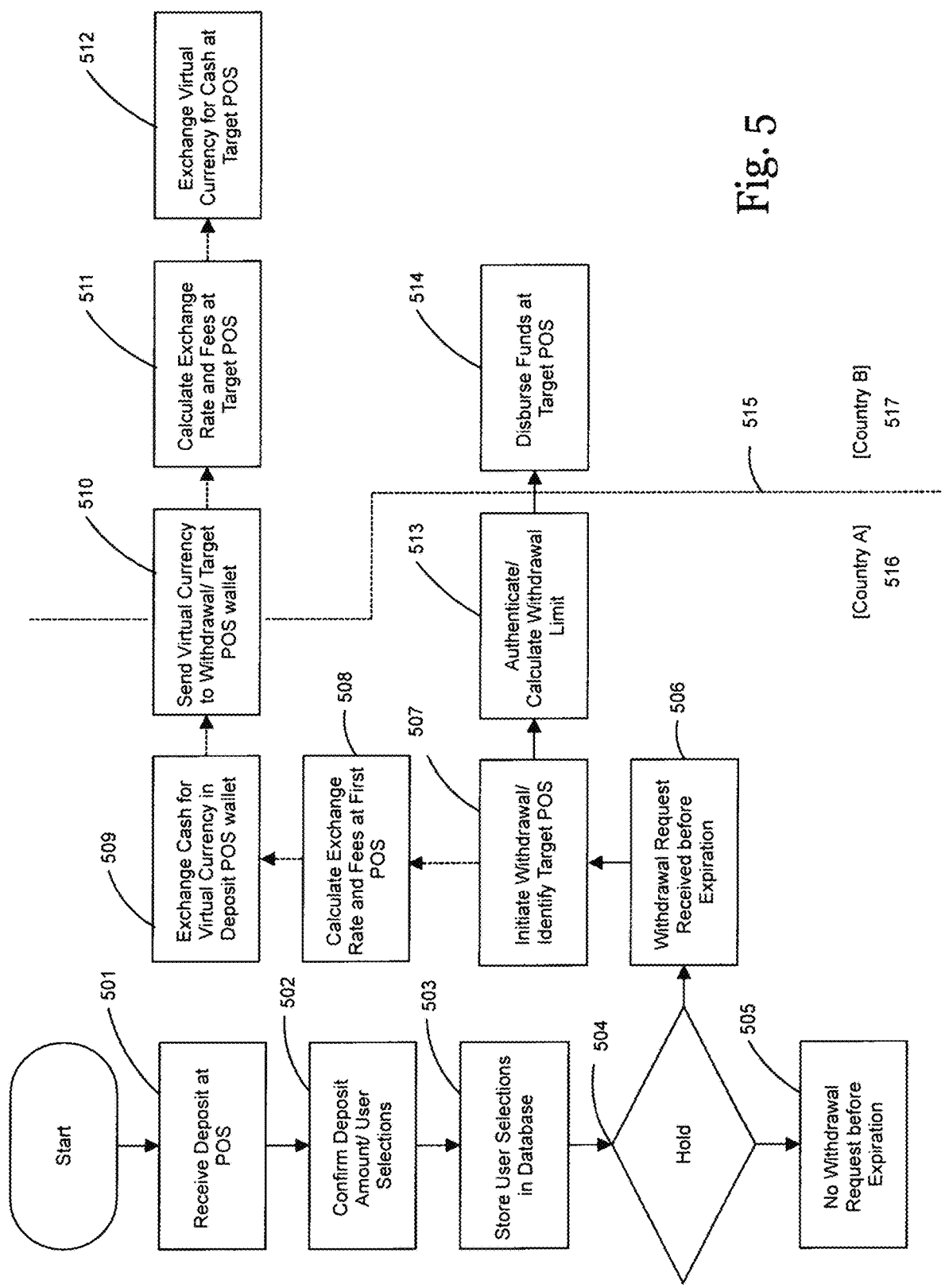
FIG. 5 is a flowchart showing a general transfer process

FIG. 5 is a flowchart showing a general funds transfer process using virtual currency. A user/customer visits a terminal and/or point of sale (POS) which received/accepts a deposit 501. The POS may execute steps to confirm the deposit 502. For example, the POS may count the funds that have been received and user selections providing specifics, configurations, and/or settings for the transaction. The settings may include, for example, user's phone number, recipient's phone number, amount of time to make the funds available to the recipient for withdrawal before expiration, etc. The user selections may be stored in a database, for example 503.

Once the deposit is confirmed and completed, a hold period 504 may begin. The funds are kept in or at the POS and remain in possession of the POS operator. During the hold period, it may be the case that no withdrawal request is made before the expiration of 505, for example, a user-selected expiration as set forth above. Alternatively, a withdrawal request may be received before the expiration 506. The withdrawal request may be at any terminal and/or point-of-sale that is part of a system or network of terminals and/or points-of-sale, for example. Therefore, the withdrawal request may be made in any country. The country may be the same or different that the deposit POS country.

A withdrawal request triggers the funds transfer and disbursement processes.

The withdrawal terminal and/or POS and location will be identified 507. For example, the country 516 of the withdrawal POS may be different than a country 517 of the deposit POS. Therefore, an exchange rate may be associated with the withdrawal POS that is different than an exchange rate associated with the deposit POS.

The withdrawal request may be authenticated 513. For example, the withdrawing user may provide and confirm ownership of a phone number that is associated with a deposit. Upon authenticating a withdrawal request, available funds may be calculated and disbursed 514.

Calculation of the disbursement funds may include several variables. For example, exchange rates at the originating country and resulting country may be taken into account. Additionally, service fees of the operators and vendors may be taken into account.

A funds transfer process may leverage or utilize a virtual currency.

An exchange rate at an originating country may be calculated along with operator and/or vendor fees 508. The funds calculated may be exchanged for virtual currency in a virtual currency wallet 509. The virtual currency wallet may be a wallet associated with the deposit POS or the operator of the deposit POS, for example.

The virtual currency may then be transferred to a virtual currency wallet associated with the target/withdrawal POS or operator of the withdrawal POS 510. The transfer may occur across a country-line 515, for example.

An exchange rate of the country of the withdrawal POS may be calculated along with operator and/or vendor fees 511. The virtual currency in the target virtual currency wallet may be exchanged for funds at the target POS 512.

EXAMPLE EMBODIMENTS

Various embodiments are described for example purposes. The embodiments, or elements of the embodiments, may be used or practiced in combination with one another.

Deposit

A customer may, for example, deposit U.S. dollars at a terminal in the United States in exchange for a cryptocurrency such as Bitcoin to be deposited into the customer's cryptocurrency wallet.

Withdrawal

In another example, a customer may, withdraw U.S. dollars at a terminal in the United States in exchange for a cryptocurrency such as Bitcoin to be withdrawn from the customer's cryptocurrency wallet.

Domestic Transfer

In another example, a customer may wish to deposit U.S. dollars at a terminal in the United States to send funds to another customer at another terminal in another location in the United States for withdrawal.

A third party or provider may facilitate the transfer. The third party may be a software service, for example.

In one example, the third party may instruct to accept funds funds received at the deposit terminal. The third party or provider may then instruct the transfer of cryptocurrency from a virtual currency wallet associated with the deposit terminal to a virtual currency wallet associated a withdrawal terminal. The third party or provider may then instruct the remittance of funds at the withdrawal terminal.

International Transfer

In another example, a customer may wish to deposit U.S. dollars at a terminal in the United States to send funds to another customer in another location outside of the United States for withdrawal.

A third party or provider may facilitate the transfer. The third party may be a software service, for example.

In one example, the third party may instruct to accept funds funds received at the deposit terminal in, for example, the United States, where the funds funds are U.S. dollars. The third party or provider may then instruct the transfer of an amount of cryptocurrency based on the local exchange rate from a virtual currency wallet associated with the deposit terminal to a virtual currency wallet associated a withdrawal terminal where the withdrawal terminal in another country, for example, Mexico. The third party or provider may then instruct the remittance of funds at the withdrawal terminal based on the local exchange rate.

A customer may visit a terminal in one country. One embodiment of the deposit process is described further below.

Figure 6:
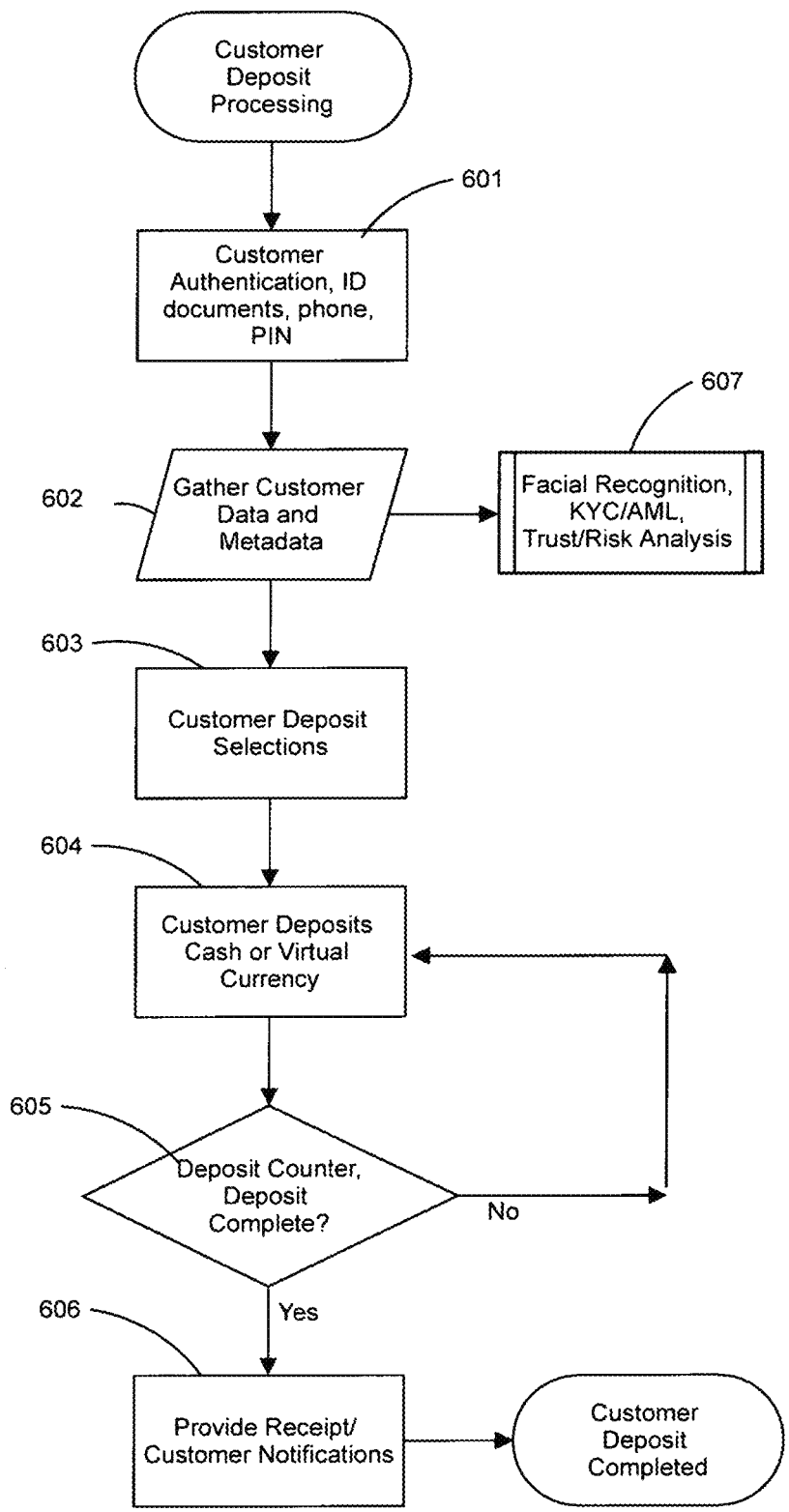
FIG. 6 is a flowchart showing a detailed view of a input process

FIG. 6 is a flowchart showing a detailed view of the deposit process.

During processing of a deposit at a POS, a customer/user may be authenticated 601. For example, a user may provide/scan an ID document such as a driver's license, provide and verify a phone number/PIN, etc. A phone may be verified, for example, by a PIN sent to the phone number by SMS after the phone number is entered at a terminal, for example. The user may be prompted to enter/verify the phone number by entering the received PIN.

Other data or metadata may be gathered and used for verification/authentication 602, such as biometric verification. For example, a camera at a terminal or POS may provide image or video data of the user's face. This may trigger a facial recognition process, a KYC/AML (Know Your Customer/Anti-Money Laundering) process, and/or a trust/risk analysis process 607. These processes may be carried out in conjunction in a non-blocking manner, or sequentially. These processes may be executed at the POS, at a proxy, and/or as a backend process. These processes may be provided by the vendor, operator, and/or a third party, and in any combination thereof.

The customer/user may make various selections 603 associated with a deposit providing specifics, configurations, and/or settings for the transaction. The settings may include, for example, user's phone number, recipient's phone number, creation of a redemption code, amount of time to make the funds available to the recipient for withdrawal before expiration, etc.

The customer/user may then deposit funds at the terminal or POS 604. The POS may execute steps to confirm the deposit is complete 605. For example, the POS may count the funds that have been received and user selections providing specifics, configurations, and/or settings for the transaction.

After the deposit is completed, the POS may provide a receipt and/or notification 606. Once the deposit is confirmed and completed, the funds are kept in or at the POS and remain in possession of the POS operator. After the expiration of the holding period, the funds funds may begin to incur holding fees, for example.

Figure 7:
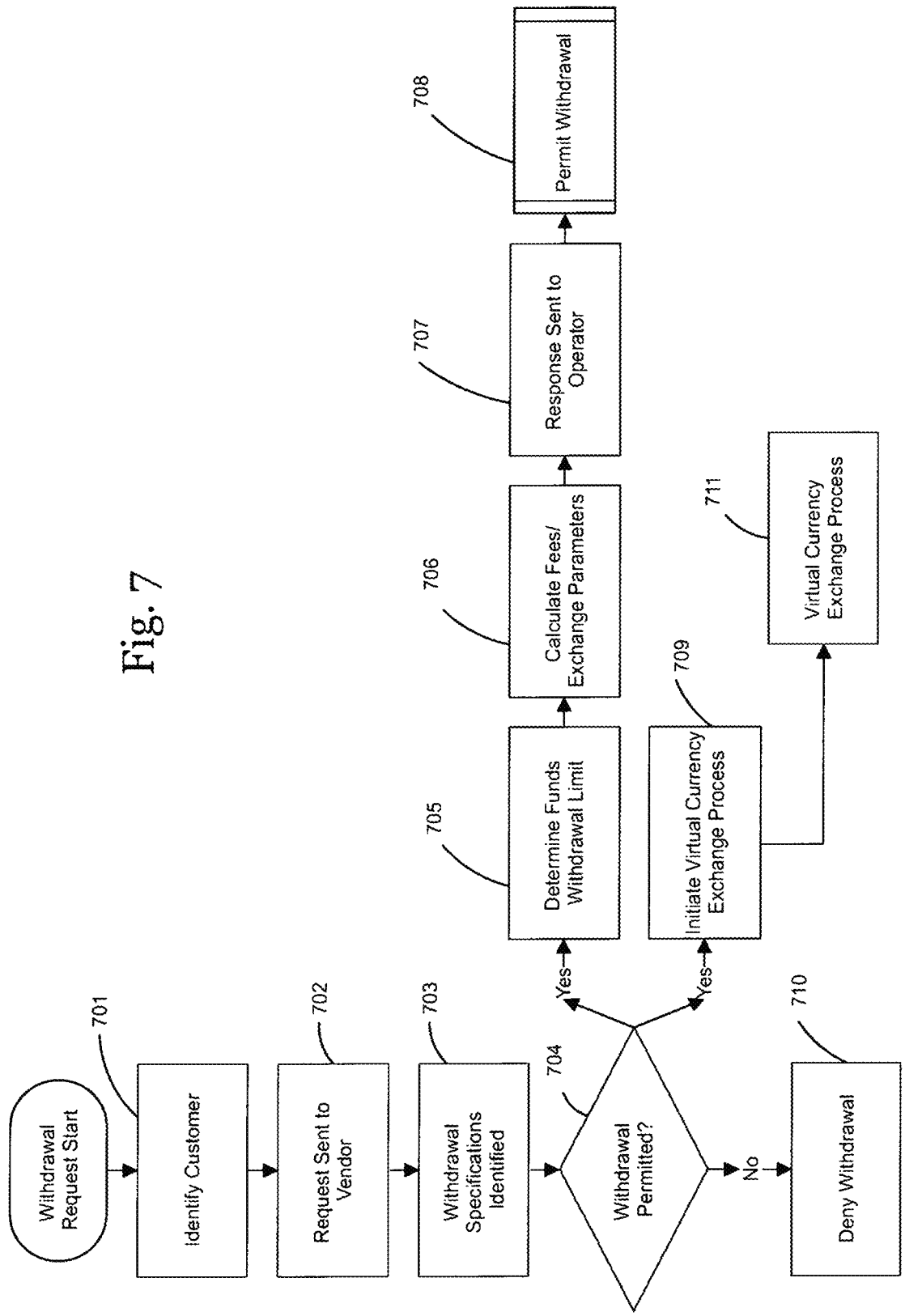
FIG. 7 is a flowchart showing a detailed view of a output process

FIG. 7 is a flowchart showing a detailed view of the withdrawal process.

A withdrawal request may be received during a hold period. The withdrawal request may be at any terminal and/or point-of-sale that is part of a system or network of terminals and/or points-of-sale, for example. Therefore, the withdrawal request may be made in any country. The country may be the same or different that the deposit POS country.

In one embodiment, the customer may deposit virtual currency to the vendor and the funds are converted to funds during the holding period to avoid or minimize realization of exchange rate fluctuations or volatility.

In another embodiment, the customer may deposit virtual currency to the vendor and the funds are not converted to funds during the holding period.

A withdrawal request triggers the funds transfer and disbursement processes.

The withdrawal terminal and/or POS and location will be identified as set forth above. The withdrawal request may be authenticated as set forth above. For example, the withdrawing user may provide and confirm ownership of a phone number that is associated with a deposit. The customer may be identified 701 and a withdrawal request may be sent to a vendor 702. The request may include specifications associated with the customer, etc. 703.

Other data or metadata may be gathered and used for verification/authentication, such as biometric verification. For example, a camera at a terminal or POS may provide image or video data of the withdrawing user's face. This may trigger a facial recognition process, a KYC/AML (Know Your Customer/Anti-Money Laundering) process, and/or a trust/risk analysis process. These processes may be carried out in conjunction in a non-blocking manner, or sequentially. These processes may be executed at the POS, at a proxy, and/or as a backend process. These processes may be provided by the vendor, operator, and/or a third party, and in any combination thereof.

If the specifications and withdrawal are not cleared during a decision process by the vendor service 704, for example, the withdrawal may be denied 710.

If the specifications and withdrawal are cleared during a decision process by the vendor service 704, for example, the withdrawal may be permitted, and a virtual currency exchange process (709, 711) may be initiated, and a funds disbursement process (705, 706, 707, 708) may be initiated.

Upon authentication or permission of a withdrawal request, funds may be calculated and disbursed. A withdrawal limit may be determined 705 based on factors such as the amount deposited, operator and vendor fees 706, exchange rate parameters 706, etc. A response from the vendor service may be sent to the operator 707 including, for example, the calculation of limits of funds allowed for withdrawal. In response, the terminal or POS may permit a withdrawal 708.

Trust Analysis Service

A trust and/or risk analysis may be carried out, optionally, for example, for the authentication/verification of a depositing or withdrawing user. The analysis may be carried out in parallel with the customer's deposit, or may be carried out before allowing a particular step of the customer's deposit to be completed, for example. For example, the analysis may be required to be completed before accepting funds or a deposit from the user. Alternatively, for example, funds or a deposit may be accepted while the analysis is performed.

In another example, a trust and/or risk analysis may be carried out in parallel with a customer's withdrawal, or may be carried out before allowing a particular step of the customer's withdrawal to be completed, for example. For example, the analysis may be required to be completed before dispensing funds or funds to the user. Alternatively, for example, funds or funds may be dispensed while the analysis is performed.

In one example, the data and metadata for trust/risk analysis processing may be delivered to a third party service provider, or vendor. The third party service, for example, may be a software service of a vendor, as set forth above. The software service may be hosted at a vendor-owned location, a third party location, or a proxy location, for example. The data and/or metadata may be sent to a processing queue of the software service. For example, the queue may be processed in a first-in-first-out (FIFO) or last-in-first-out (LIFO) order. The queue may collect several processes to be carried out. The processes may, for example, be similar trust/risk analysis processes from various POS locations, or different processes.

The service may be hosted on elastic server architecture, in one example, as set forth above. In another example, the service may be hosted using serverless architecture, as set forth above.

Various actions may be taken in response to the outcome of the analysis.

One advantage of the use of cryptocurrency is the ability to eliminate third parties or additional parties. However, one disadvantage associated with this is that cryptocurrency transactions by bad actors are more easily enabled. It is useful and necessary then to establish whether a user is trustworthy.

A trust score may be computed, established, stored, and/or updated for a user. The trust score may be used to increase or decrease, for example, user capabilities or privileges at a point of sale node or terminal. For example, in one embodiment, a trust score exceeding a threshold score may allow or unlocks for the user a higher transaction limit privilege.

In one embodiment, when a trust score does not exceed a certain minimum threshold, additional actions or inputs may be required of a user at a point of sale node or terminal. For example, a user may be required or requested to provide additional identification, scan an ATM card, or provide a biometric input if a trust score does not exceed a certain minimum threshold. It will be recognized that any input or requirement that can affect a trust score may be required or requested.

In one embodiment, when a trust score does not exceed a certain minimum threshold, a user transaction or other request may be denied.

A trust score may incorporate, or take into account, any number of factors, wherein each factor may be assigned a weight. A weighted factor, for example the product of a factor and a respective weight, may provide a trust factor. A trust score may be a sum of various trust factors. It will be understood that any of a trust score, factor, or weight, may be positive, zero, or negative.

One factor may be a facial verification or recognition factor.

In one embodiment, a user's facial image data or video data, for example, may be gathered at a point of sale node or terminal, or any other computing device, such as a user's mobile device. One or more parameters of the image or video data may be stored. The entire image or video data may be stored.

In one embodiment, facial recognition may be performed based on a video sequence or one or more video frames of a user's face gathered at a node or terminal, or any other computing device, such as a user's mobile device, for example. In one embodiment, facial recognition may be performed based on an image of a user's face gathered at a node or terminal, or any other computing device, such as a user's mobile device, for example.

The facial data may be processed on the client side at the node or terminal, at a proxy, on the server side, or any combination of such locations thereof, wherein various steps or portions of processing may be performed at each location.

Facial Verification or Recognition

It will be understood that any facial recognition algorithm, or combinations or hybrids thereof, might be used.

In one embodiment, a facial verification method may be used to compare a user's face with one or more datasets. A dataset may be, for example, a training dataset, a model dataset, a stored dataset of previous or known users, or a stored criminal or blacklist dataset.

One or more datasets may be selected as training datasets and/or models and one or more cost functions may be defined. In one example, a cost function may be a Kullback-Leibler divergence, or difference, from a selected dataset or model. An optimization problem may be defined.

One factor may be a user geolocation factor.

A geolocation factor may be gathered as associated with a user. In one example, a user may share a mobile device geolocation with a service. A request for geolocation may be sent to a user mobile device, for example.

In one embodiment, a user geolocation may be compared with a point of sale location. A factor may be determined based on the proximity of the two geolocations.

One factor may be a point of sale geolocation factor.

A geolocation factor may be gathered as associated with a point of sale. In one example, an IP address that is connected with, or used by, a point of sale may be associated with a geolocation.

In one embodiment, a point of sale geolocation may be compared with a user geolocation. A factor may be determined based on the proximity of the two geolocations.

One factor may be an ATM card verification factor.

An ATM card may be issued to a user of a cryptocurrency terminal. The card may include a chip, barcode, account number, and/or magnetic strip. The ATM card may be read by a cryptocurrency terminal for verification. A factor may be associated with a ATM-verified user.

One factor may be an age of account factor.

An account age may be determined. For example, a creation may be determined. A factor may be associated with the account age.

One factor may be a previous incident factor.

A list of incidents may be associated with an account and stored. An incident may be a suspicious event that has been flagged. For example, an incident may include exceeding a threshold number of failed logins within a certain window of time, of time period of a predefined length.

A factor may be associated with each incident. Alternatively, a factor may be associated with a threshold number of incidents.

One factor may be a metadata factor.

One factor may be a PIN verification factor.

One factor may be a mobile device PIN verification factor.

One factor may be biometric factor such as a fingerprint, finger scan, or palm scan.

One factor may be a distance from last transaction probability factor.

One factor may be a credit card verification factor.

One factor may be an ID card verification factor.

One factor may be a QR code verification factor.

One factor may be a mobile device bluetooth verification factor.

One factor may be a security pattern verification factor.

One factor may be a geographic criminal activity factor.

One factor may be a transaction anomaly factor.

Transaction data for a user or group of users may produce a probability distribution. For example, transaction amounts may follow a normal, or Gaussian, distribution for a particular location, or across many locations, wherein a particular mean transaction amount is determined.

Thus, a transaction amount may deviate from a mean by some portion or multiple of a standard deviation. Larger deviations may be more anomalous then.

In one embodiment, a larger standard deviation may be associated with a particular factor, which may be a negative factor. Addition of a negative factor in a trust score may penalize the trust score.

One factor may be a transaction location anomaly factor.

Transaction location data for a user or group of users may produce a probability distribution. For example, transaction locations may follow a normal, or Gaussian, distribution for a particular location, or across many locations, wherein a particular mean transaction location is determined.

Thus, a transaction location may deviate from a mean by some portion or multiple of a standard deviation. Larger deviations may be more anomalous then.

In one embodiment, a larger standard deviation may be associated with a particular factor, which may be a negative factor. Addition of a negative factor in a trust score may penalize the trust score.

Calculation of Trust Score or Risk Score

Thus, a trust score may be calculated by including one or more weighted factors. In one example, a trust score (TS) based on a factor ($f_1$) at a weight ($w_1$), and a factor ($f_2$) at a weight ($w_2$):

$$TS = w_1 f_1 + w_2 f_2$$

Thus, for many (x) factors, a trust score may be calculated:

$$TS = w_1 f_1 + w_2 f_2 \ldots w_x f_x$$

or $$TS = \sum_{l}^{x} w_x f_x$$

Trust Score Distribution

Trust scores amongst a certain set, subset, portion, or group of users may form a probability distribution. For example, trust scores may follow a normal, or Gaussian, distribution for a group of users, wherein a particular mean trust score is determined.

Thus, a user's computed or determined trust score may deviate from a mean by some portion or multiple of a standard deviation. Larger deviations may be more anomalous then.

In one embodiment, a larger standard deviation may be associated with a less trustworthy user. A threshold standard deviation or portion of a standard deviation may be defined. A comparison or relationship between a user's trust score and a threshold standard deviation from a mean trust score may be established. User privileges at a point of sale, or in or for a user account, may be determined according to whether the user's trust score exceeds the threshold.

Updating for Trust or Risk

It will be understood that information or metadata about users may increase over time. For example, a new user may complete a cryptocurrency transaction with certain characteristics such as location, time, transaction amount, etc., and, over time, that user will complete additional transactions with their own characteristics-some characteristics may be the same, or similar, to those characteristics of the earlier transactions. These transaction data or characteristics may be stored.

Thus, the information or metadata surrounding the user increases over time as additional data surrounding transactions are aggregated.

A running, or aggregate, trust score may be associated with a user. Thus, a prior, or posterior, trust score may exist for a user prior to a transaction. After a transaction the prior trust score may be updated.

Figure 8:
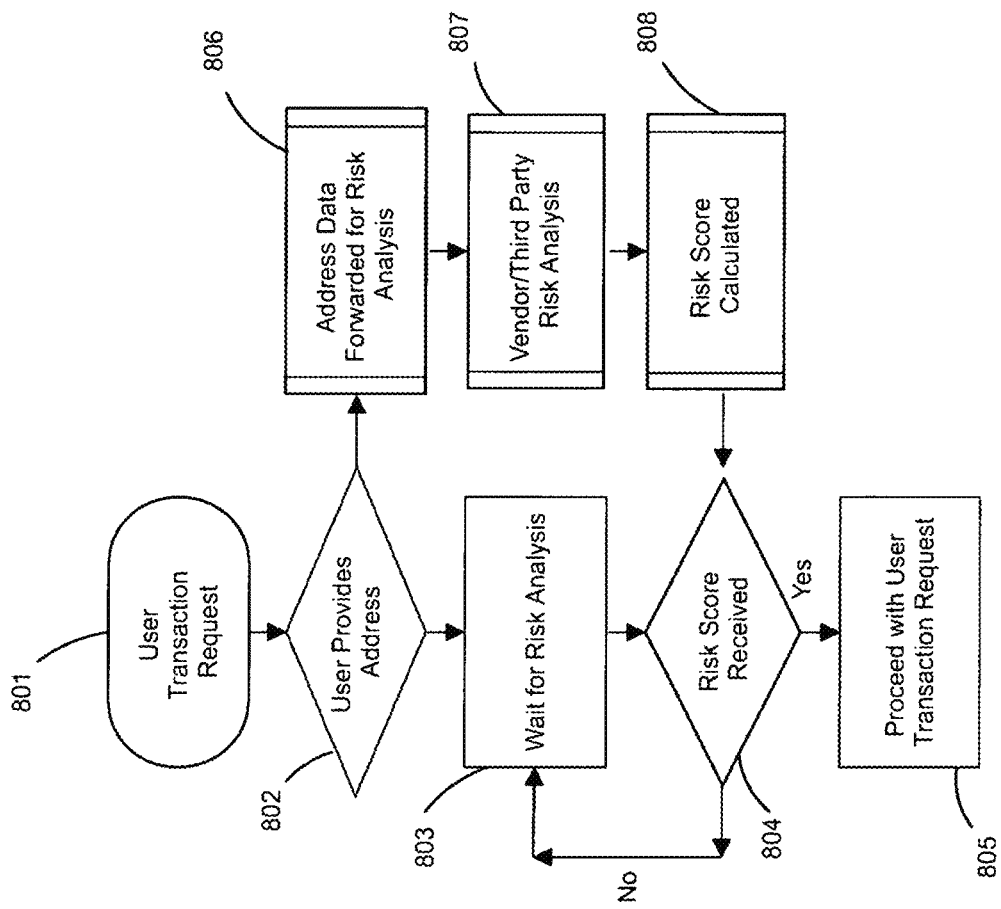
FIG. 8 is a flowchart showing a general view of a score analysis process

FIG. 8 is a flowchart showing a general view of a risk analysis process.

A user may initiate a transaction request 801. Upon doing so, a user may provide, or be prompted to provide credentials for a virtual currency wallet 802. For example, a user may enter a wallet address manually, or scan a barcode or other address representation at a point of sale. The point of sale may be a terminal, for example. After the user provides the address, the terminal may wait for a response 803 from a vendor or third party service. The service may be a risk analysis service, for example, that provides a risk score for a given address. After the risk score is received 804, the terminal may allow the transaction to proceed or move forward 805.

After the user enters a wallet address, the address and/or user data may be forwarded a vendor or third party service 8u6. As set forth above, the service may be a risk analysis service, for example, that provides a risk score for a given address. The service may perform a risk analysis 807 and calculated a risk score 808. The risk score may be provided, in response, back to the point of sale.

Figure 9A:
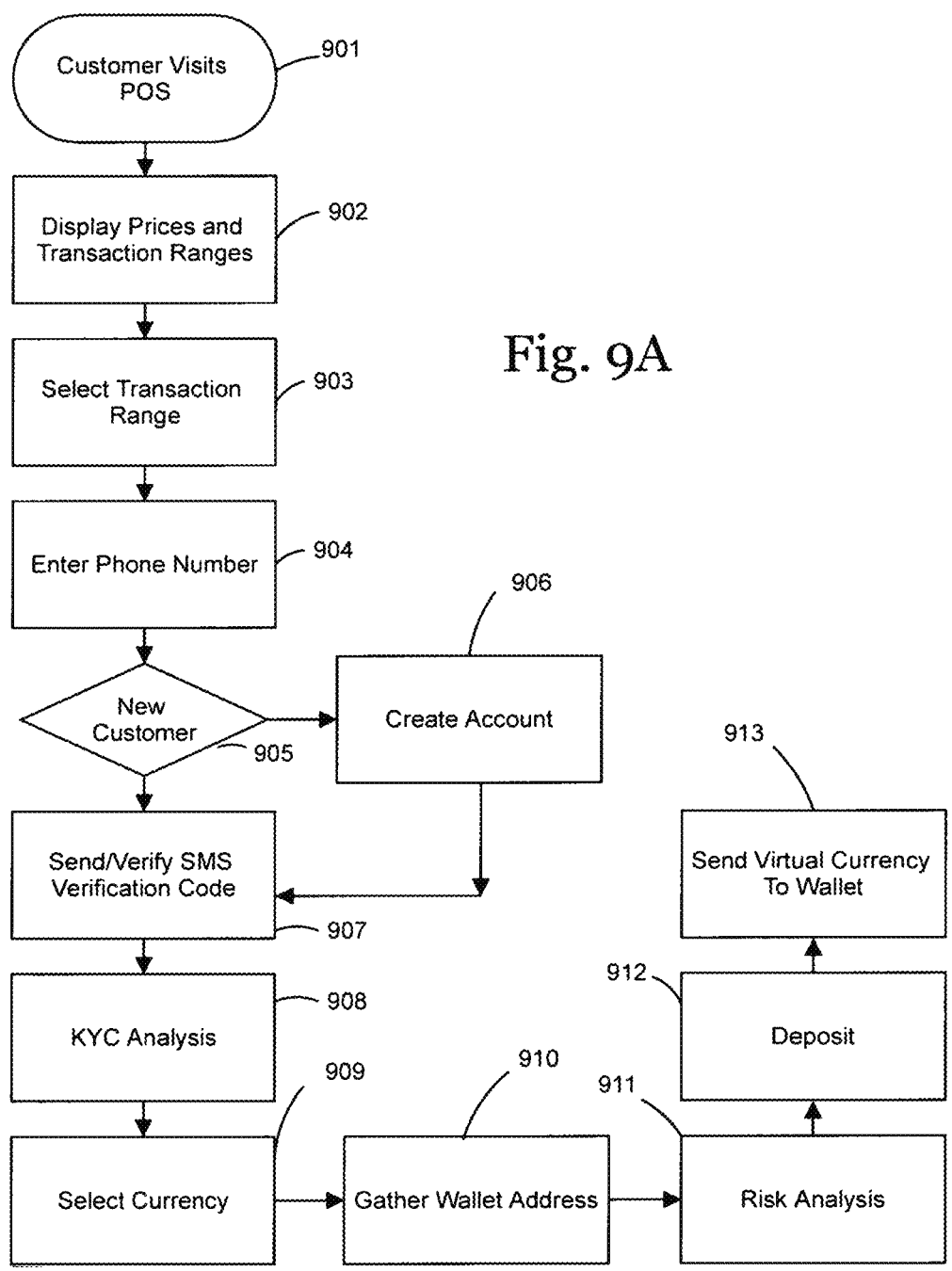
FIG. 9A is a flowchart showing an input process.

FIG. 9A is a flowchart showing a customer funds deposit process.

A customer may visit a point of sale 901, which may be, for example, a hardware terminal such as an automated teller machine capable of one or both of cash and virtual currency transactions. The point of sale may display selection options such as "Deposit" and "Withdrawal", current prices of various virtual currencies and/or customer selections such as transaction ranges 902. For example, ranges for a cash to virtual currency (such as Bitcoin, for example) deposit transactions may be displayed. In one example, a range of $0-$500 may be displayed, wherein a user can opt to deposit up to $500 cash into a virtual currency wallet. The customer may select a range 903. The customer may be prompted to enter a phone number, for example his/her mobile phone number 904.

A determination may be made as to whether the phone number entered is associated with an existing account or known user 905. For example, a database may be queried for the entered phone number. If no account is found, a user may be prompted to create an account 906. If an account is found, an SMS verification code may be sent to the entered phone number 907. In another embodiment, the SMS code may be sent before the database is queried. After the user entered the SMS code, if the entered code matches the code that was sent, the transaction may be allowed to continue. If the entered code does not match, the transaction may be denied, for example. The user may be allowed to request a new code. The requests may be limited, for example, to 5 attempts before the account is locked.

Once an account is identified, a KYC/AML ("know-your-customer" or "anti-money laundering") verification analysis may be performed 908. In one example, a user account may include any combination of identification document data such as an associated name, date of birth, address, social security number, driver's license number, passport number, and/or any other data from an identification document associated with the account.

The data may be forwarded, by a core service provider or vendor, to a service provider. The service provider may be a software service provider that may be a third party software service provider.

For example, data may be forwarded from the core service provider or vendor to a third party software service provider in the form of an HTTP request to an API endpoint, for example, a URL, of the third party software service provider, and responses may be returned. HTTP methods used may include, for example GET, HEAD, POST, PUT, PATCH, DELETE, CONNECT, OPTIONS and TRACE. The HTTP requests and/or responses may include application/json content type, wherein data may be JSON encoded data. Additionally HTTP status codes may be used to indicate success and failure.

An HTTP request to an API endpoint may require authentication. For example, the API may conform to a Representational State Transfer (REST) style. For example, an API key, token, access key, and/or secret key may be provided by the third party software service to the core service provider or vendor. Keys may be included in HTTP headers, for example, for every HTTP request. Keys may be in the form of a string, such as a base64 encoded string, for example. Similarly, a timestamp may be included in HTTP headers for HTTP requests to an API endpoint. A Hash-based Message Authentication Code may be computed using a hash function, for example, a SHA256 hash function.

An HTTP request to an API endpoint may include a payload. The request and payload may be formatted as any HTTP request. For example, a request may be made using various programming languages or combinations of programming languages, such as CURL, Ruby, Python, Node, PHP, Java, and/or JSON.

The payload may include any combination of identification document data such as an associated name, date of birth, address, social security number, driver's license number, passport number, and/or any other data from an identification document associated with the account. The payload may be formatted in HTML, XML, JSON, or another format.

The service provider may return, to the core service provider or vendor, a result that may include one or more flags, states, parameters, metrics, or scores associated with the account. For example, 0, 1, or 2 may be returned to indicate no match, partial match, or match. The result may be stored in association with the account, and the date and/or time of the request and/or retrieval of the result may be also stored. The result may include a payload formatted in HTML, XML, JSON, or another format.

As an example a JSON response payload can include elements such as whether an ID element, such as address, name, and/or date of birth are verified, partially verified, or not verified, and/or elements such as associated risk scores calculated for each element, or a combination of elements:

For example, such a payload could include:
{
"address": "1",
"address_risk": "high",
"identification": "0",
"date_of_birth": "2"
}

In one example, a request for a verification may be made to a third party service provider, wherein a verification or risk score is based on the specifics of fund contributors to a queried address. A risk score may be, for example, a numeral ranging from 0 to 10, wherein 0 or 1 correspond to little, low, or no risk, and 9 or 10 correspond to high risk. In another example, a risk score may be a floating point value such as 0.001 or 4.58.

In another example, a request for a risk score may be made to a third party service provider, wherein the risk score is based on the specifics of recipients of funds from a queried address.

In another embodiment, it may be determined, by a core service provider or vendor, that a risk analysis has been performed on the account within a certain timeframe. For example, it may be determined that a risk analysis has been performed within the last week. Based on such a determination, the request to the service provider may be skipped. For example, if a risk analysis for the account was requested within the previous week and the associated account was cleared, trusted, and/or otherwise determined to be low risk, based on a query of the aforementioned stored results and/or date/time, then a risk analysis may be skipped.

After the phone number is verified, the customer may be allowed to select a virtual currency from a set of virtual currency 909. For example, the customer may select "Bitcoin" from a set comprising "Bitcoin", "Litecoin", "Ethereum", etc.

After selection, a virtual currency wallet address may be gathered 910. For example, a user may scan a QR code for a virtual currency wallet shown on a mobile device. In other examples, a user may manually enter a virtual currency wallet address, or a virtual currency wallet address may be created.

The virtual currency wallet address may be used to perform a risk analysis 911.

A KYC/AML ("know-your-customer" or "anti-money laundering") verification analysis may also be performed 908. In one example, a user account may include any combination of identification document data such as an associated name, date of birth, address, social security number, driver's license number, passport number, and/or any other data from an identification document associated with the account.

The data may be forwarded, by a core service provider or vendor, to a service provider. The service provider may be a software service provider that may be a third party software service provider.

For example, data may be forwarded from the core service provider or vendor to a third party software service provider in the form of an HTTP request to an API endpoint, for example, a URL, of the third party software service provider, and responses may be returned. HTTP methods used may include, for example GET, HEAD, POST, PUT, PATCH, DELETE, CONNECT, OPTIONS and TRACE. The HTTP requests and/or responses may include application/json content type, wherein data may be JSON encoded data. Additionally HTTP status codes may be used to indicate success and failure.

An HTTP request to an API endpoint may require authentication. For example, the API may conform to a Representational State Transfer (REST) style. For example, an API key, token, access key, and/or secret key may be provided by the third party software service to the core service provider or vendor. Keys may be included in HTTP headers, for example, for every HTTP request. Keys may be in the form of a string, such as a base64 encoded string, for example. Similarly, a timestamp may be included in HTTP headers for HTTP requests to an API endpoint. A Hash-based Message Authentication Code may be computed using a hash function, for example, a SHA256 hash function.

An HTTP request to an API endpoint may include a payload. The request and payload may be formatted as any HTTP request. For example, a request may be made using various programming languages or combinations of programming languages, such as CURL, Ruby, Python, Node, PHP, Java, and/or JSON.

The payload may include elements such as a type of analysis performed, an asset type, an address or transaction hash, a type of analysis, and a customer reference or ID.

As an example a JSON request payload can include:
{
"type": "transaction",
"asset": "LTC",
"hash": "dvf35gh . . . ebrvryh6",
"address": "khbKJB98y . . . jbaAYGAB83",
"type": "source",
"customer_id": "3234"
}

The service provider may return, to the core service provider or vendor, a result that may include one or more flags, states, parameters, metrics, or scores associated with the account. The result may be stored in association with the account, and the date and/or time of the request and/or retrieval of the result may be also stored.

As an example JSON response payload can include:
{
"id": 4542,
"date": "2018-05-04",
"risk_score": "10.54"
}

In one example, a request for a verification may be made to a third party service provider, wherein a verification or risk score is based on the specifics of fund contributors to a queried address. A risk score may be, for example, a numeral ranging from 0 to 10, wherein 0 or 1 correspond to little, low, or no risk, and 9 or 10 correspond to high risk. In another example, a risk score may be a floating point value such as 0.001 or 4.58.

In another example, a request for a risk score may be made to a third party service provider, wherein the risk score is based on the specifics of recipients of funds from a queried address.

Figure 9B:
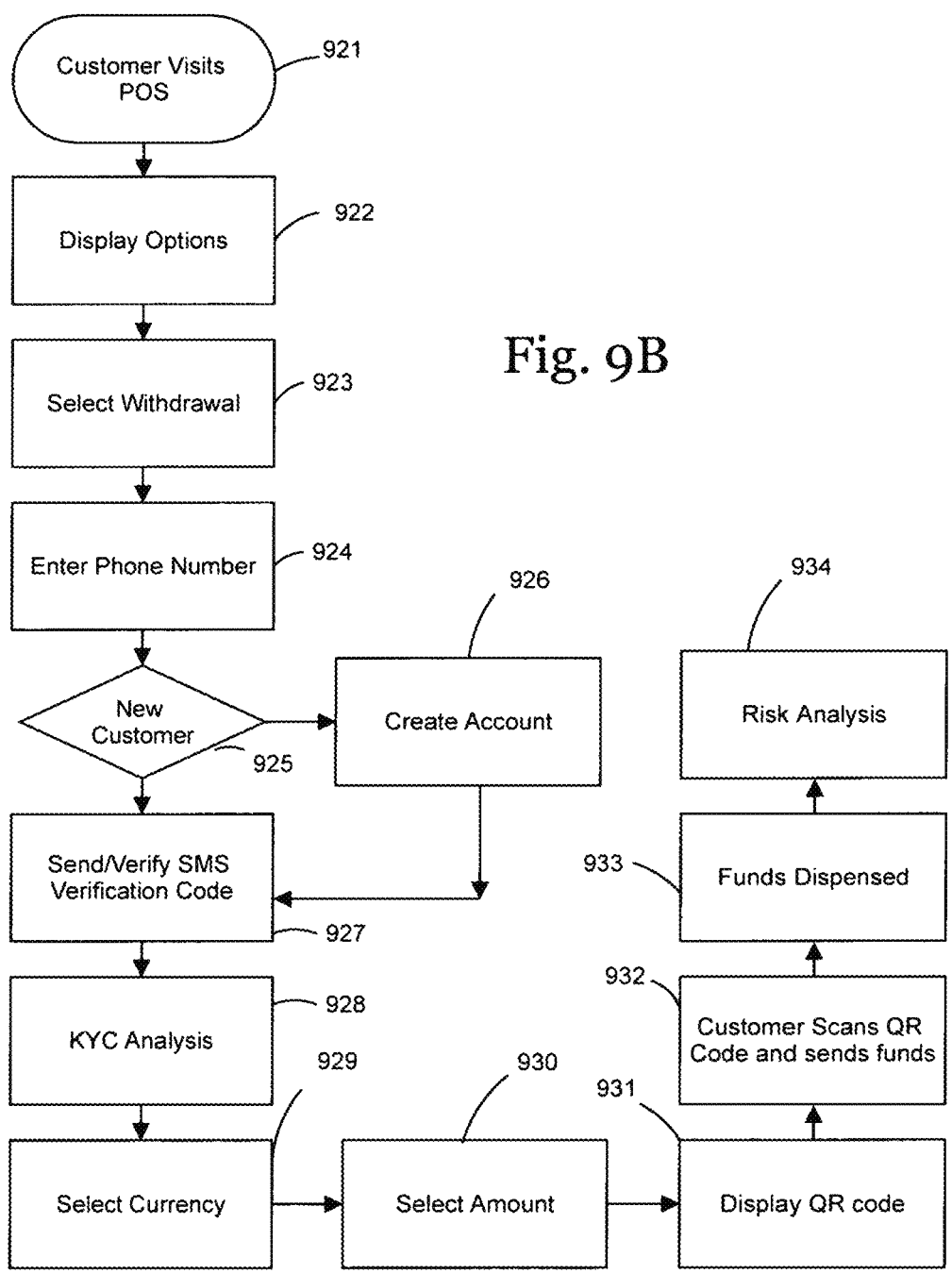
FIG. 9B is a flowchart showing an output process.

FIG. 9B is a flowchart showing a customer funds withdrawal process.

A customer may visit a point of sale 921, which may be, for example, a hardware terminal such as an automated teller machine capable of one or both of cash and virtual currency transactions. The point of sale may display selection options such as "Deposit" and "Withdrawal", current prices of various virtual currencies and/or customer selections such as transaction ranges 922. The customer may select "Withdrawal" 923. The customer may be prompted to enter a phone number, for example his/her mobile phone number 924.

A determination may be made as to whether the phone number entered is associated with an existing account or known user 925. For example, a database may be queried for the entered phone number. If no account is found, a user may be prompted to create an account 926. If an account is found, an SMS verification code may be sent to the entered phone number 927. In another embodiment, the SMS code may be sent before the database is queried. After the user entered the SMS code, if the entered code matches the code that was sent, the transaction may be allowed to continue. If the entered code does not match, the transaction may be denied, for example. The user may be allowed to request a new code. The requests may be limited, for example, to 5 attempts before the account is locked.

Once an account is identified, a KYC/AML ("know-your-customer" or "anti-money laundering") verification analysis may be performed 928. In one example, a user account may include any combination of identification document data such as an associated name, date of birth, address, social security number, driver's license number, passport number, and/or any other data from an identification document associated with the account.

The data may be forwarded, by a core service provider or vendor, to a service provider. The service provider may be a software service provider that may be a third party software service provider.

For example, data may be forwarded from the core service provider or vendor to a third party software service provider in the form of an HTTP request to an API endpoint, for example, a URL, of the third party software service provider, and responses may be returned. HTTP methods used may include, for example GET, HEAD, POST, PUT, PATCH, DELETE, CONNECT, OPTIONS and TRACE. The HTTP requests and/or responses may include application/json content type, wherein data may be JSON encoded data. Additionally HTTP status codes may be used to indicate success and failure.

An HTTP request to an API endpoint may require authentication. For example, the API may conform to a Representational State Transfer (REST) style. For example, an API key, token, access key, and/or secret key may be provided by the third party software service to the core service provider or vendor. Keys may be included in HTTP headers, for example, for every HTTP request. Keys may be in the form of a string, such as a base64 encoded string, for example. Similarly, a timestamp may be included in HTTP headers for HTTP requests to an API endpoint. A Hash-based Message Authentication Code may be computed using a hash function, for example, a SHA256 hash function.

An HTTP request to an API endpoint may include a payload. The request and payload may be formatted as any HTTP request. For example, a request may be made using various programming languages or combinations of programming languages, such as CURL, Ruby, Python, Node, PHP, Java, and/or JSON.

The payload may include any combination of identification document data such as an associated name, date of birth, address, social security number, driver's license number, passport number, and/or any other data from an identification document associated with the account.

The service provider may return, to the core service provider or vendor, a result that may include one or more flags, states, parameters, metrics, or scores associated with the account. For example, 0, 1, or 2 may be returned to indicate no match, partial match, or match. The result may be stored in association with the account, and the date and/or time of the request and/or retrieval of the result may be also stored. The result may include a payload formatted in HTML, XML, JSON, or another format.

For example, such a payload could include:
{
"address": "1",
"address_risk": "high",
"identification": "0",
"date_of_birth": "2"
}

In one example, a request for a verification may be made to a third party service provider, wherein a verification or risk score is based on the specifics of fund contributors to a queried address. A risk score may be, for example, a numeral ranging from 0 to 10, wherein 0 or 1 correspond to little, low, or no risk, and 9 or 10 correspond to high risk. In another example, a risk score may be a floating point value such as 0.001 or 4.58.

In another example, a request for a risk score may be made to a third party service provider, wherein the risk score is based on the specifics of recipients of funds from a queried address.

In another embodiment, it may be determined, by a core service provider or vendor, that a risk analysis has been performed on the account within a certain timeframe. For example, it may be determined that a risk analysis has been performed within the last week. Based on such a determination, the request to the service provider may be skipped. For example, if a risk analysis for the account was requested within the previous week and the associated account was cleared, trusted, and/or otherwise determined to be low risk, based on a query of the aforementioned stored results and/or date/time, then a risk analysis may be skipped.

After the phone number is verified, the customer may be allowed to select a virtual currency from a set of virtual currency 929. For example, the customer may select "Bitcoin" from a set comprising "Bitcoin", "Litecoin", "Ethereum", etc.

For example, ranges for a cash to virtual currency (such as Bitcoin, for example) withdrawal transactions may be displayed. The customer may select a range 930. In one example, a range of $0-$50 may be displayed, wherein a user can opt to withdraw up to $50 cash from a virtual currency wallet.

After selection, a virtual currency wallet address may be displayed, for example as a QR code 931. The wallet address may represent a wallet address associated with the operator of the point of sale. A user may scan the QR code for the virtual currency wallet shown 932 to send funds from his/her virtual currency wallet. Once the funds have been sent to the operator or point of sale virtual currency wallet, corresponding cash funds may be dispensed 933. The cash funds may calculated be less any fees, for example.

The virtual currency wallet transaction or sender address may be used to perform a KYC/AML ("know-your-customer" or "anti-money laundering") risk analysis 934

The data may be forwarded, by a core service provider or vendor, to a service provider. The service provider may be a software service provider that may be a third party software service provider.

For example, data may be forwarded from the core service provider or vendor to a third party software service provider in the form of an HTTP request to an API endpoint, for example, a URL, of the third party software service provider, and responses may be returned. HTTP methods used may include, for example GET, HEAD, POST, PUT, PATCH, DELETE, CONNECT, OPTIONS and TRACE. The HTTP requests and/or responses may include application/json content type, wherein data may be JSON encoded data. Additionally HTTP status codes may be used to indicate success and failure.

An HTTP request to an API endpoint may require authentication. For example, the API may conform to a Representational State Transfer (REST) style. For example, an API key, token, access key, and/or secret key may be provided by the third party software service to the core service provider or vendor. Keys may be included in HTTP headers, for example, for every HTTP request. Keys may be in the form of a string, such as a base64 encoded string, for example. Similarly, a timestamp may be included in HTTP headers for HTTP requests to an API endpoint. A Hash-based Message Authentication Code may be computed using a hash function, for example, a SHA256 hash function.

An HTTP request to an API endpoint may include a payload. The request and payload may be formatted as any HTTP request. For example, a request may be made using various programming languages or combinations of programming languages, such as CURL, Ruby, Python, Node, PHP, Java, and/or JSON.

The payload may include elements such as a type of analysis performed, an asset type, an address or transaction hash, a type of analysis, and a customer reference or ID.

As an example a JSON request payload can include:
{
"type": "transaction",
"asset": "LTC",
"hash": "dvf35gh . . . ebrvryh6",
"address": "khbKJB98y . . . jbaAYGAB83",
"type": "source",
"customer_id": "3234"
}

The service provider may return, to the core service provider or vendor, a result that may include one or more flags, states, parameters, metrics, or scores associated with the account. The result may be stored in association with the account, and the date and/or time of the request and/or retrieval of the result may be also stored.

As an example JSON response payload can include:
{
"id": 4542,
"date": "2018-05-04",
"risk_score": "10.54"
}

In one example, a request for a verification may be made to a third party service provider, wherein a verification or risk score is based on the specifics of fund contributors to a queried address. A risk score may be, for example, a numeral ranging from 0 to 10, wherein 0 or 1 correspond to little, low, or no risk, and 9 or 10 correspond to high risk. In another example, a risk score may be a floating point value such as 0.001 or 4.58.

In another example, a request for a risk score may be made to a third party service provider, wherein the risk score is based on the specifics of recipients of funds from a queried address.

The virtual currency wallet address and transaction details may be stored by a software service provider. In one example, this risk analysis may be performed after the withdrawal. In one example, if the account is deemed high risk, the account may be flagged or placed in a "hold" or "pending approval" state, or similar.

Customer Transaction/Request Interview

In one embodiment, a progressive, interactive interview is presented to the customer via a terminal or point of sale display, using, for example, a series of one or more graphical user interfaces (GUIs) in a browser element.

During the presentation of the GUIs in the interview, data may be stored at the terminal or point of sale, at least temporarily reflecting customer selections. In one example, cookies may be stored in association with the customer/transaction in a user session, using, for example, JavaScript.

The cookies may then be utilized to prepare or produce a payload for transmission, for example, a JSON encoded data element. In another embodiment, such a payload/JSON encoded data element may be prepared without the use of cookies.

The JSON encoded data element may comprise multiple elements reflecting the customer selections and/or request along with information such as identifying information of the terminal or point of sale at which the request is being prepared and timestamps. Additionally, API keys and/or API secret keys may be included with the payload data element.

In some embodiments, as the customer makes the selections a stored machine state is updated. This can be maintained in various network locations, for example, near the edge or at a central server location. Caches at the client terminal or point of sale, or in the network path or at the central server may be used to store a machine state, for example.

There may be a time period set at which the state or session times out. For example, after 1 minute of inactivity or lack of state changes, the session or state is cleared, logged off and/or ended, etc.

In an example embodiment, a customer approaches a terminal or point of sale. The customer may select a transaction type, for example, "Buy Virtual Currency," and selects type of virtual currency, for example, "Bitcoin," in a GUI display of the terminal or point of sale.

The machine state stored in a database, datastore, or internet of things model, for example. The machine state may be incrementally updated with each secure request associated with a user selection, to build a string or payload, for example. Each request may be filtered at the service provider side, where security measures may be in place. For example, code injection requests may be logged along with the origin. Further, the origin may be blocked from making further requests until the request is reviewed and cleared.

This reduces what may be stored locally and allows machine state to be maintained, even when, for example, connection is lost.

The request specifications may be aggregated into a complete payload to make a complete request. On submission, for example, via a command from the user to make or submit the request, the complete aggregate payload may be used to deliver a complete request to the vendor or software service provider.

Figure 9C:
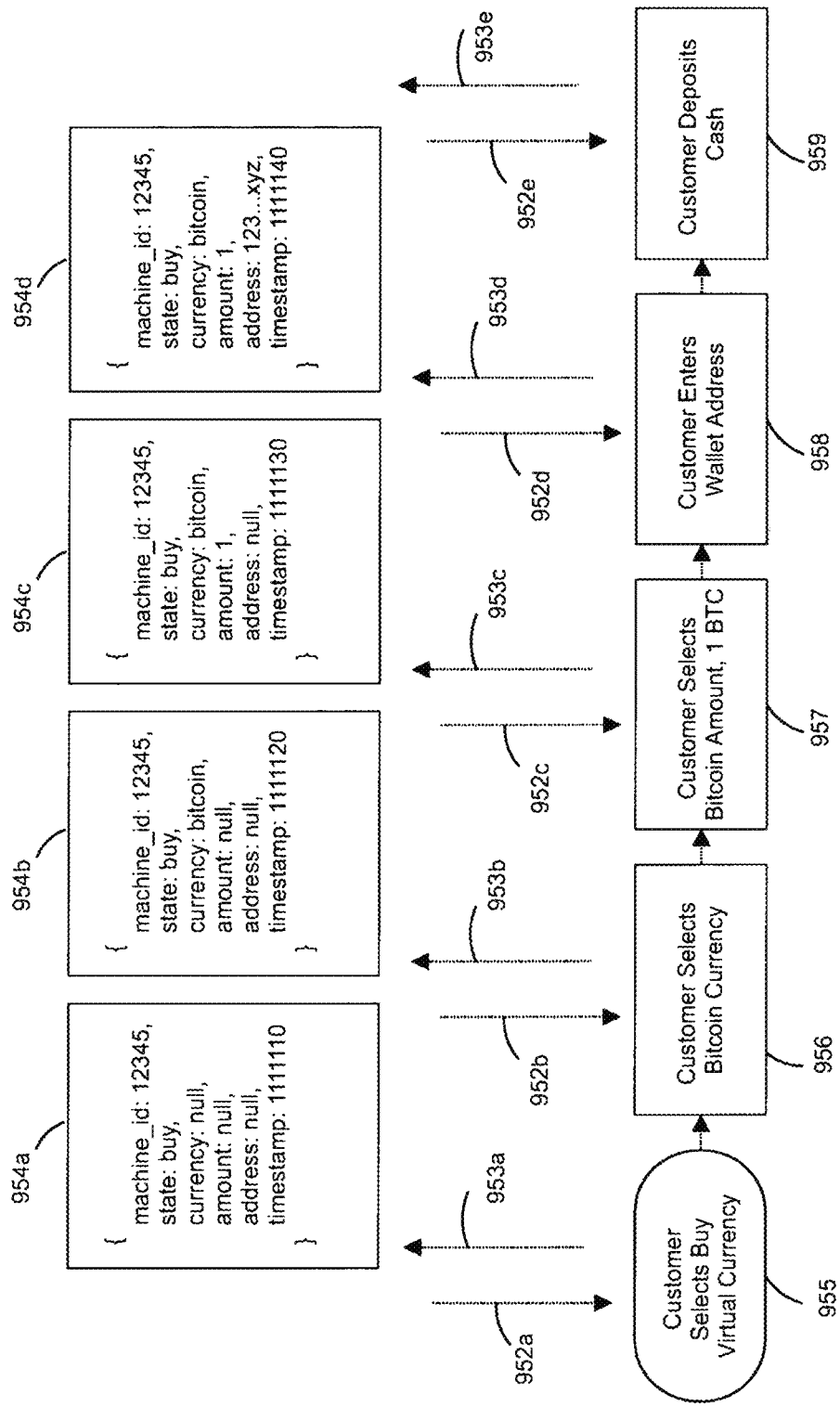
FIG. 9C is a flowchart showing an input process connected with a terminal machine state.

FIG. 9C is a flowchart showing a customer funds deposit and virtual currency purchase process connected with a virtual currency machine state.

An example sequence is provided. It will be understood that the given steps are optional and/or may be rearranged. A user or customer may visit a terminal which may be a virtual currency terminal, for example.

The customer may be presented with a series of user interfaces in an interview to allow for ascertaining the customer's specifications for a transaction request. The customer interview corresponds to 955-959, for example. A machine state corresponds to 954a-954d, for example. The machine state may be stored in any location between the client and the cloud service. For example, the machine state may be stored or cached locally at the terminal, near the edge or fog layer, or at a central server.

During the customer interview, queries/requests (952a-952e) and updates (953a-953e) may be made between the terminal and a software service. The queries and updates may handle and/or update a machine state (954a-954d) associated with the terminal. It will be understood that data elements 954a-954d could include other parameters. Additionally, such data elements could include, for example, API keys and/or secret keys.

In one embodiment, a customer may select to purchase a virtual currency 955 in exchange for cash via a cash deposit at the terminal. An initial state for the terminal may be empty or null, for example. The initial state may be requested 952a before or during the customer's initial selection 955, for example and communicated from a software service provider via a secure session via a VPN. The query may be communicated from the software service provider as an encrypted payload that is decrypted at the terminal. For example, a JSON data element may be created or prepared by the software service provider. The data element may be encrypted and delivered to the terminal.

After the customer's selection to buy virtual currency, an update for the terminal machine state may be communicated to a software service provider via a secure session via a VPN. The update may include the delta or changes to the initial or current machine state. The update may be communicated to the software service provider as an encrypted payload. For example, a JSON data element may be created or prepared at the terminal. The data element may be encrypted and delivered to the software service provider 953a.

The software service provider may decrypt the payload to reveal a decrypted payload 954a and update the machine state for the terminal, for example by updating a database or datastore.

The current machine state may be queried or requested 952b before or during the customer's next selection 956, for example and communicated from a software service provider via a secure session via a VPN. The query may be communicated from the software service provider as an encrypted payload that is decrypted at the terminal. For example, a JSON data element may be created or prepared by the software service provider. The data element may be encrypted and delivered to the terminal.

The customer may select a virtual currency 956 to buy in exchange for cash via a cash deposit at the terminal.

After the customer's selection to buy "Bitcoin" 956, for example, an update for the terminal machine state may be communicated to a software service provider via a secure session via a VPN. The update may include the delta or changes to the initial or current machine state. The update may be communicated to the software service provider as an encrypted payload 953b. For example, a JSON data element may be created or prepared at the terminal. The data element may be encrypted and delivered to the software service provider. The software service provider may decrypt the payload 953b and update the machine state for the terminal, for example by updating a database or datastore.

The current machine state may be queried or requested 952c before or during the customer's next selection 957, for example, and communicated from a software service provider via a secure session via a VPN. The query may be communicated from the software service provider as an encrypted payload that is decrypted at the terminal. For example, a JSON data element may be created or prepared by the software service provider. The data element may be encrypted and delivered to the terminal.

The customer may select a virtual currency amount 957 to buy 1 Bitcoin (BTC).

After the customer's selection to buy "1 BTC," for example, an update for the terminal machine state may be communicated to a software service provider via a secure session via a VPN. The update may include the delta or changes to the initial or current machine state. The update may be communicated to the software service provider as an encrypted payload 953c. For example, a JSON data element may be created or prepared at the terminal. The data element may be encrypted and delivered to the software service provider. The software service provider may decrypt the payload to reveal a decrypted payload 954c and update the machine state for the terminal, for example by updating a database or datastore.

The current machine state may be queried or requested 952d before or during the customer's next selection or action 958, for example, and communicated from a software service provider via a secure session via a VPN. The query may be communicated from the software service provider as an encrypted payload that is decrypted at the terminal. For example, a JSON data element may be created or prepared by the software service provider. The data element may be encrypted and delivered to the terminal.

The customer may enter a virtual currency wallet address 958.

After the customer's entry, for example, an update for the terminal machine state may be communicated to a software service provider via a secure session via a VPN. The update may include the delta or changes to the initial or current machine state. The update may be communicated to the software service provider as an encrypted payload 953d. For example, a JSON data element may be created or prepared at the terminal. The data element may be encrypted and delivered to the software service provider. The software service provider may decrypt the payload to reveal a decrypted payload 954d and update the machine state for the terminal, for example by updating a database or datastore.

The current machine state may be queried or requested 952e before or during the customer's next selection or action 959, for example, and communicated from a software service provider via a secure session via a VPN. The query may be communicated from the software service provider as an encrypted payload that is decrypted at the terminal. For example, a JSON data element may be created or prepared by the software service provider. The data element may be encrypted and delivered to the terminal.

The customer may deposit cash 959.

After the customer's action, for example, an update for the terminal machine state may be communicated to a software service provider via a secure session via a VPN. The update may include the delta or changes to the initial or current machine state. The update may be communicated to the software service provider as an encrypted payload 953e. For example, a JSON data element may be created or prepared at the terminal. The data element may be encrypted and delivered to the software service provider. The software service provider may decrypt the payload to reveal a decrypted payload and update the machine state for the terminal, for example by updating a database or datastore.

Figure 9D:
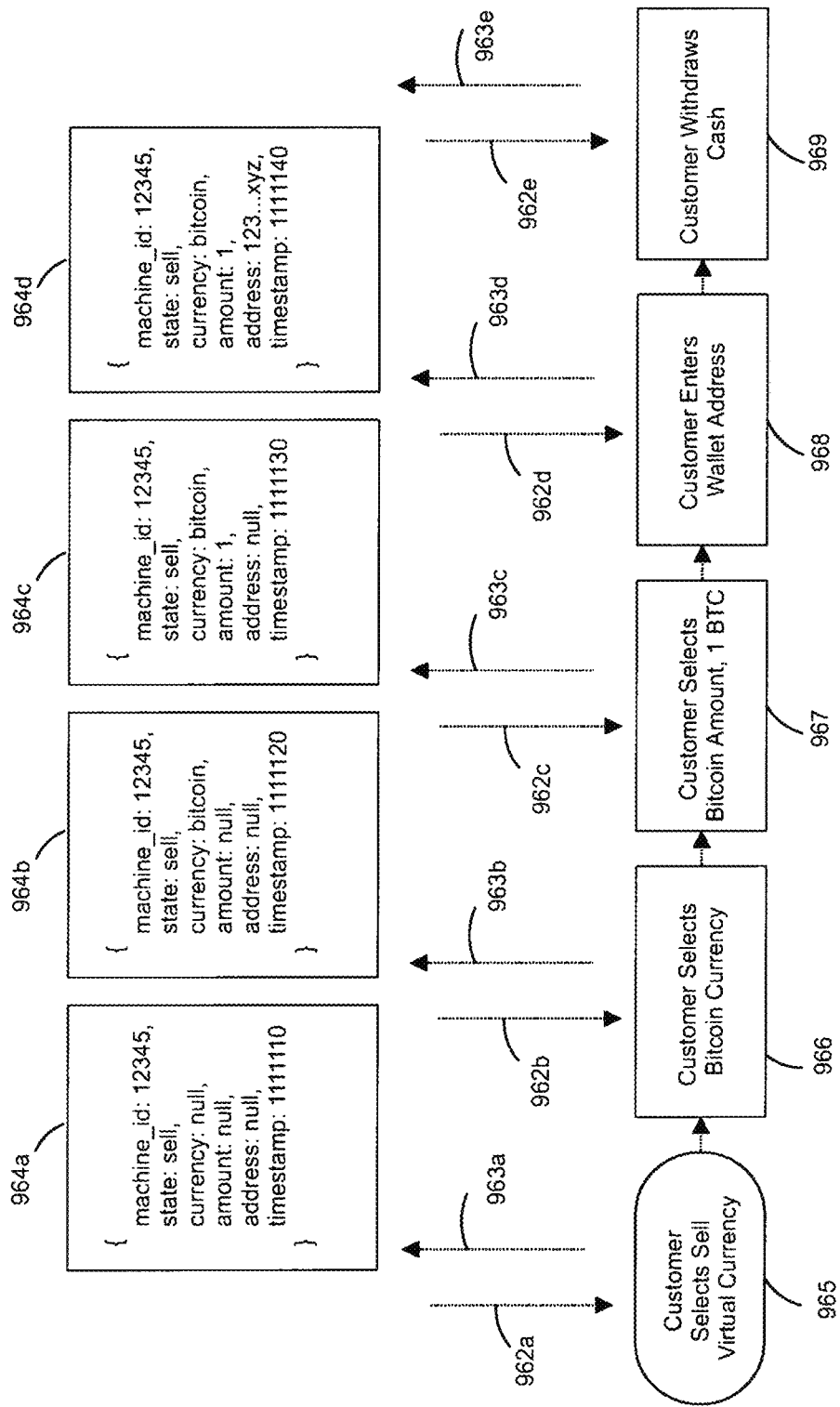
FIG. 9D is a flowchart showing an output process connected with a terminal machine state.

FIG. 9D is a flowchart showing a customer funds withdrawal and virtual currency sale process connected with a virtual currency machine state.

An example sequence is provided. It will be understood that the given steps are optional and/or may be rearranged. A user or customer may visit a terminal which may be a virtual currency terminal, for example.

The customer may be presented with a series of user interfaces in an interview to allow for ascertaining the customer's specifications for a transaction request. The customer interview corresponds to 965-969, for example. A machine state corresponds to 964a-964d, for example. The machine state may be stored in any location between the client and the cloud service. For example, the machine state may be stored or cached locally at the terminal, near the edge or fog layer, or at a central server.

During the customer interview, queries/requests (962a-962e) and updates (963a-963e) may be made between the terminal and a software service. The queries and updates may handle and/or update a machine state (964a-964d) associated with the terminal. It will be understood that data elements 964a-964d could include other parameters. Additionally, such data elements could include, for example, API keys and/or secret keys.

In one embodiment, a customer may select to sell a virtual currency 965 in exchange for cash via a cash withdrawal at the terminal. An initial state for the terminal may be empty or null, for example. The initial state may be requested 962a before or during the customer's initial selection 965, for example and communicated from a software service provider via a secure session via a VPN. The query may be communicated from the software service provider as an encrypted payload that is decrypted at the terminal. For example, a JSON data element may be created or prepared by the software service provider. The data element may be encrypted and delivered to the terminal.

After the customer's selection to sell virtual currency, an update for the terminal machine state may be communicated to a software service provider via a secure session via a VPN. The update may include the delta or changes to the initial or current machine state. The update may be communicated to the software service provider as an encrypted payload. For example, a JSON data element may be created or prepared at the terminal. The data element may be encrypted and delivered to the software service provider 963a. The software service provider may decrypt the payload to reveal a decrypted payload 964a and update the machine state for the terminal, for example by updating a database or datastore.

The current machine state may be queried or requested 962b before or during the customer's next selection 966, for example and communicated from a software service provider via a secure session via a VPN. The query may be communicated from the software service provider as an encrypted payload that is decrypted at the terminal. For example, a JSON data element may be created or prepared by the software service provider. The data element may be encrypted and delivered to the terminal.

The customer may select a virtual currency 966 to sell in exchange for cash via a cash withdrawal at the terminal.

After the customer's selection to sell "Bitcoin" 966, for example, an update for the terminal machine state may be communicated to a software service provider via a secure session via a VPN. The update may include the delta or changes to the initial or current machine state. The update may be communicated to the software service provider as an encrypted payload 963b. For example, a JSON data element may be created or prepared at the terminal. The data element may be encrypted and delivered to the software service provider. The software service provider may decrypt the payload 963b and update the machine state for the terminal, for example by updating a database or datastore.

The current machine state may be queried or requested 962c before or during the customer's next selection 967, for example, and communicated from a software service provider via a secure session via a VPN. The query may be communicated from the software service provider as an encrypted payload that is decrypted at the terminal. For example, a JSON data element may be created or prepared by the software service provider. The data element may be encrypted and delivered to the terminal.

The customer may select a virtual currency amount 967 to sell 1 Bitcoin (BTC).

After the customer's selection to sell "1 BTC," for example, an update for the terminal machine state may be communicated to a software service provider via a secure session via a VPN. The update may include the delta or changes to the initial or current machine state. The update may be communicated to the software service provider as an encrypted payload 963c. For example, a JSON data element may be created or prepared at the terminal. The data element may be encrypted and delivered to the software service provider. The software service provider may decrypt the payload to reveal a decrypted payload 964c and update the machine state for the terminal, for example by updating a database or datastore.

The current machine state may be queried or requested 962d before or during the customer's next selection or action 968, for example, and communicated from a software service provider via a secure session via a VPN. The query may be communicated from the software service provider as an encrypted payload that is decrypted at the terminal. For example, a JSON data element may be created or prepared by the software service provider. The data element may be encrypted and delivered to the terminal.

The customer may enter a virtual currency wallet address 968.

After the customer's entry, for example, an update for the terminal machine state may be communicated to a software service provider via a secure session via a VPN. The update may include the delta or changes to the initial or current machine state. The update may be communicated to the software service provider as an encrypted payload 963d. For example, a JSON data element may be created or prepared at the terminal. The data element may be encrypted and delivered to the software service provider. The software service provider may decrypt the payload to reveal a decrypted payload 964d and update the machine state for the terminal, for example by updating a database or datastore.

The current machine state may be queried or requested 962e before or during the customer's next selection or action

969, for example, and communicated from a software service provider via a secure session via a VPN. The query may be communicated from the software service provider as an encrypted payload that is decrypted at the terminal. For example, a JSON data element may be created or prepared by the software service provider. The data element may be encrypted and delivered to the terminal.

The customer may withdraw cash 969.

After the customer's action, for example, an update for the terminal machine state may be communicated to a software service provider via a secure session via a VPN. The update may include the delta or changes to the initial or current machine state. The update may be communicated to the software service provider as an encrypted payload 963*e*. For example, a JSON data element may be created or prepared at the terminal. The data element may be encrypted and delivered to the software service provider. The software service provider may decrypt the payload to reveal a decrypted payload and update the machine state for the terminal, for example by updating a database or datastore.

User Defined Security Protocols

In one embodiment, an operator or vendor is allowed to select various settings to customize a security protocol. Any individual setting, or combination of settings, may be used together to provide a factor or various factors.
   a. One setting may be a minimum purchase amount setting.
   b. One setting may be a maximum purchase setting.
   c. One setting may be a customer identification requirement. A customer identification requirement may be comprised of one or more of the following, for example:
      i. SMS Verification
      ii. Fingerprint
      iii. Part of a social security number, for example, the last four digits
      iv. Photo ID
      v. Face photo
      vi. Barcode or Magnetic Stripe Scan of government ID
      vii. First name
      viii. Last name
      ix. Address
      x. Date of Birth
      xi. A third party trust or risk score
      xii. A bank card
   d. A 24-hour customer volume limit
   e. A minimum customer age Linking/Monitoring "Shared" Profiles When a customer or user submits an ID, the data on the ID is compared with all other customers in the owner-operator's customer database. If the ID data matches any other customers other than the current customer at the machine, the system or software may flag the customer as having submitted a duplicate ID. The customer's account is then placed in the 'pending review' state for manual review by the owner-operator, and the system or software may alert the owner-operator via a text message and email notification of the behavior.

Owner-operators may 'link' different customers or users together with a common unique identifier "UUID". For example, when two or more customer profiles are 'linked' through a unique identifier, the customers' available purchasing power for buying and selling on the owner-operator's machines is inclusive of the daily volume done across all the linked profiles.

Linked Profiles Example

Customer A has a $500 purchasing power based on their verification tier.

Customer A and Customer B are linked to a custom unique identifier.

Customer B has already transacted $200 for the day.

When Customer A visits an owner-operator's machine, they will only be able to buy $300.

Freezing "UUID" Accounts/Profiles

Owner-operator may also automatically freeze transactions for customers who have been "linked" together as a UUID because it is suspected they are sharing financial information. Such a feature permits the owner-operator to have complete control over who is using their terminals or kiosks, by freezing transactions associated with specific customers, whereby no virtual currency will be sent thus allowing for additional due diligence to be gathered before allowing a transaction to be completed.

Detecting "Shared" Virtual Currency Wallets

The system and method also may allow the ability to detect when a customer's virtual currency wallet address has been shared between multiple customers. When a customer enters a virtual currency wallet address to where they desire their virtual currency to be sent, the software automatically cross-references this address across all of the owner-operator's transactions. If the address has already been used by a different customer whose profile is not already linked to the current customer through a common unique identifier, the current customer's account may then placed in the 'pending review' state for manual review by the owner-operator, and the software alerts the owner-operator via a text message and email notification of the shared wallet address.

Detecting Contradictory Account Information

The system and method may allow the ability to detect and flag when there is a mismatch between information submitted by a customer at different verification tiers. For instance, if a customer scans an ID that includes the name "Bob Smith" but then later submits a registration application with the name of "Johnny Appleseed" their account may be placed in the 'pending review' state for manual review by the owner-operator, and the system or software may alert the owner-operator via a text message and email notification of the customer identification mismatch.

Customer Volume Limits

The system and method may allow the ability to manually set the volume limits for a given customer, regardless of where they may otherwise stand based on the information they've submitted and the owner-operator's requirements. This allows owner-operators to effectively scale a customer's purchasing power up or down based on perceived risk or enhanced due-diligence.

Crypto Wallet Address Volume Limits

The system and method may allow a terminal or kiosk owner-operator to set volume limits for a specific virtual currency wallet address in the event that a customer (or customers) is/are using said wallet to avoid normal KYC/AML detection.

Ownership Pledge of Crypto Wallet

The system and method may require a terminal or kiosk customers to accept personal ownership of the wallet that they are using when transacting on the kiosk, which acts as a pre-emptive safeguard against unlawful money transmission, in addition to helping flag and prevent possible scam-related transactions where users are, under duress, told to send money to third parties.

Automatic Account Freeze—Age

The system and method may permit a terminal or kiosk owner-operator to implement a standard procedure to freeze all new customer accounts depending on the customer's age. For example, an owner-operator can set a rule for all his/her kiosks that all new customers under 18 who register an account will be frozen until reviewed and then approved by owner-operator.

Blacklisting Customers/Accounts

The system and method may allow the ability to "blacklist" virtual currency wallet addresses and ID cards. This provides additional alerting to the owner-operator, as they receive an additional text message and email notification in the event that any customer enters a wallet address or scans an ID card that has been blacklisted by the owner-operator. Any customer submitting a blacklisted datapoint is automatically placed in the 'pending review' state for manual review by the owner-operator.

"Hours of Operation" Controls

The system and method may allow the ability for owner-operators to specify hours of operation for their terminals or kiosks. This ensures that the owner-operator is only providing exchange services through their kiosks between a set opening and closing time schedule. The kiosk becomes unavailable between the hours after closing and before opening time and customers are not able to transact.

Face Detection

A face detection process may occur at a client terminal. For example a hardware camera may be used to gather user image or video data. A user's face may be detected within the data, for example, by selecting image frames or frames within a video containing a detected face.

In one embodiment, some or all of a face detection may occur at a client terminal. For example, a face may be identified and localized in an image or video data of a user. Coordinates of facial features may be determined and bounding boxes may be defined for each feature or combination of features. Facial attributes and landmarks may be detected, and distances between features or landmarks may be determined. The scale and orientation of a detected face may be determined. A confidence score may be determined which provides a confidence level estimate of the face detection prediction or determination. A confidence score may be used to determine a next process.

In one embodiment, parts of such image or video data, or processed or preprocessed data, may be forwarded to a core service provider or vendor, or further to a service provider, and face detection as above may be carried out by the service. For example a base64 encoded image or full image file may be communicated to the server from a client terminal. The service provider may be a software service provider that may be a third party software service provider.

For example, data may be forwarded from the core service provider or vendor to a third party software service provider in the form of an HTTP request to an API endpoint, for example, a URL, of the third party software service provider, and responses may be returned. HTTP methods used may include, for example GET, HEAD, POST, PUT, PATCH, DELETE, CONNECT, OPTIONS and TRACE. The HTTP requests and/or responses may include application/json content type, wherein data may be JSON encoded data. Additionally HTTP status codes may be used to indicate success and failure.

An HTTP request to an API endpoint may require authentication. For example, the API may conform to a Representational State Transfer (REST) style. For example, an API key, token, access key, and/or secret key may be provided by the third party software service to the core service provider or vendor. Keys may be included in HTTP headers, for example, for every HTTP request. Keys may be in the form of a string, such as a base64 encoded string, for example. Similarly, a timestamp may be included in HTTP headers for HTTP requests to an API endpoint. A Hash-based Message Authentication Code may be computed using a hash function, for example, a SHA256 hash function.

An HTTP request to an API endpoint may include a payload. The request and payload may be formatted as any HTTP request. For example, a request may be made using various programming languages or combinations of programming languages, such as CURL, Ruby, Python, Node, PHP, Java, and/or JSON.

The payload may include, for example, a base64 encoded image version or a full image file.

The service provider may return, to the core service provider or vendor, a result that may include one or more flags, states, parameters, metrics, or scores associated with the request. For example, 0, 1, or 2 may be returned to indicate no match, partial match, or match. The result may be stored in association with the account, and the date and/or time of the request and/or retrieval of the result may be also stored. The result may include a payload formatted in HTML, XML, JSON, or another format.

For example, such a payload could include:

{
"Base64Image": {
"ImageBytes": "iVBORwoKGgoAAAANSUhEUgA . . ."
}
}

Machine Learning (ML)

A server side model may be trained using user data, such as image or video data. Image or video data may be forwarded to the server from a client terminal.

In one embodiment, parts of such data, or processed or preprocessed data may be forwarded to the server, for example a base64 encoded image or full image file may be communicated to the server from a client terminal. A decentralized learning model may be carried out on a client terminal device or server-side.

An application on the terminal device may download a machine learning model, for example, in compressed form. Such a model may also be pre-installed on a client terminal. Such a model may be pre-trained on a selected dataset, for example, currently known users, or known criminals etc. Known users, for example, may be those for which image, video, or face data already exists, associated with an account, and/or has been verified. Changes to the model, for example, addition of new user data, on a server may be downloaded to a terminal. This allows for less dependency on online connectivity. For example, preprocessing and training of the model may be carried out at a terminal without needing to send data to a server, reducing overhead for the client and server. For example, a server machine learning model may be retrained simply using delta values calculated at the client and sent to the server. This is additionally advantageous since the system can function offline. Round-trip to server and processing time is also reduced, creating a lower latency for the end user.

Computation, storage, networking, decision making, and data management resources and applications may be placed or allocated at a server of, for example, a cloud service provider, or nearer the edge. For example, resources may be allocated network elements, such as servers, cloudlets, or caches, closer to the end user at a client device may be utilized. In one example, fog computing may place resources closer to end users to reduce latency, for example.

Some examples of the advantages of the presented technology include speed, efficiency, and security over present systems. In one example, by performing more CPU intensive processes closer to the edge or at the endpoint, transmission of data requiring heavier bandwidth, such as image or video, may be reduced or eliminated, in some cases. In another example, privacy may be more preserved when such data items need not be transmitted through the network.

Therefore, placing resources and performing computations closer to the end user has advantages for processes such as facial recognition in terminal devices such as reducing latency and creating more relevancy for end users and/or providing relevant data for computations. For example, a terminal device may be perform a facial recognition process for an end user, however, since the end user must be physically present at the geographic location of the device or terminal, the likelihood of the user revisiting the same device, or nearby devices, is increased. Therefore, maintaining data associated with the user's facial recognition process closer to the geographic endpoint where it is performed provides a more relevant dataset and reduces the need for central server round trips, for example. Computational load is also decreased for each request. That is, rather than one large shared dataset, many datasets are effectively created and localized or hyper-localized.

In one embodiment, a hierarchy of computational resources is provided. For example, a central server or software service may be provided as a first, top, or core layer, such as in a cloud layer. At least a second layer may be provided between the first layer and an edge layer of devices or terminal. The second layer may contain computational resources such as servers, proxies, or caches between the top layer elements and a subset of edge elements. Each of the network elements of the second layer may be then more closely associated with particular edge devices, wherein the edge elements may be with closer proximity to each other. Thus, the second elements may be more closely associated with particular geographic locales.

In one embodiment, various important or relevant features represented as numerical vectors are extracted from an image or video of a customer at the terminal or device.

Extracted features may be compared to, for example, features of training images, which may be various images of the same face, for example, in a database. For such a comparison, the database is queried in order to determine the nearest-neighbor feature for some or all of each feature extracted at the terminal or device. An approximation nearest-neighbor search may be executed.

The closest feature matched data may be selected, which may be geometrically verified. Accordingly, a threshold value may be determined above which a match is considered to be found. If it is determined that a match is not found at the terminal or device, a request may be forwarded to a cloud server, for example. The request may include the extracted features and/or image gathered.

A model present at the terminal or device may be retrained using the features or feature data gathered.

In one embodiment, a geographic location of a device may be determined. From the geographic location, a subset of the model may be selected as the most relevant. The subset may be compared with the image to check for a hit. If there is not hit, a broader subset of the model, or the whole model, may be selected for comparison.

In one embodiment, various models may be stored, and a particular model may be selected according to one or more metrics. For example, a geographic location of a device may be used to determine a particular model. This model may be delivered, installed, and/or updated on terminals or devices in geographic locale. For example, a particular model may be used for terminals or devices with an IP address in the United States, or in a region of the United States such as a southwest region.

Models may be blended models, including selected model sets, for example, criminal data sets plus geographic user data sets.

Figure 10:
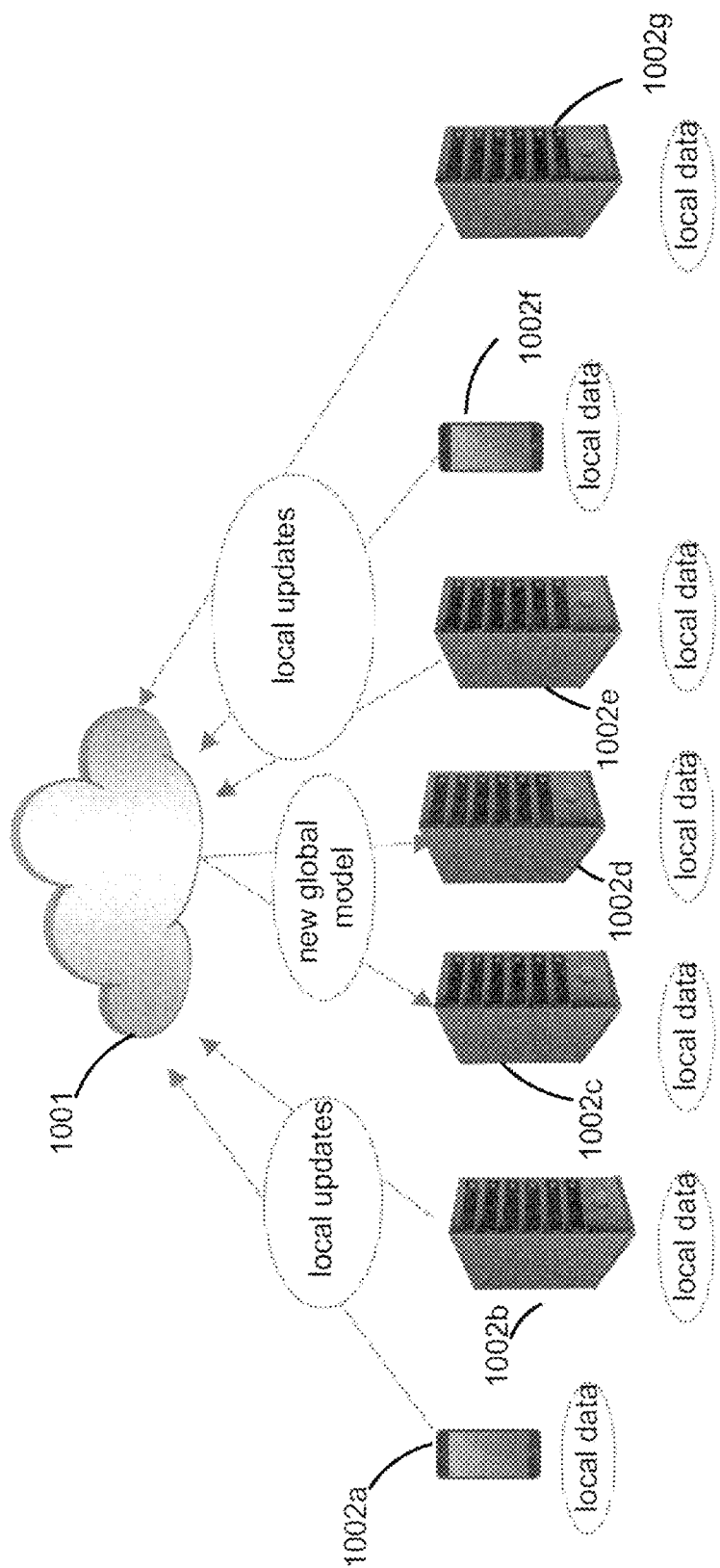
FIG. 10 is a diagram showing a decentralized learning network.

FIG. 10 is a diagram showing a decentralized learning network.

Various network client devices (1002*a*-1002*g*), such as mobile phones (1002*a*, 1002*f*) or hardware terminals (1002*b*-1002*e*, 1002*g*) as previously described may be connected through a cloud network 1001. The cloud network may include services provided by a software service provider.

In a decentralized learning network, client devices 1002*a*-1002*g* may each house or store local data and machine learning models. Changes to the local models may be calculated and updated, and the updates may be communicated to the service provider. The service provider may update a global model according to the updates received. Thereafter, the new global model or global updates may be distributed to the client devices. The process may be then repeated.

Nodes Management

In one embodiment, a vendor or software service provider may provide software services for terminals operated by one or more operators. Each operator may own or operate one or more terminals.

The terminals may be, for example, virtual currency transaction terminals, as above.

The vendor or software service provider may provide account management tools to the operators, for example, the cloud-hosted account management websites or portals.

Messaging Service

A messaging service may be provided by a service provider. The service may be delivered via cloud services. It will be understood that cloud services may refer to software services and the like at any layer, including services closer to the edge, for example, such as in a fog computing environment, and in other examples, centralized services further from the edge.

The service provider, or core service provider, may make determinations regarding transaction requests. One advantage of such an environment is that it allows for centralized updating of the services and/or deployment of updates.

Another advantage of this environment is scalability. In one example, cloud computing resources may be easily replicated and added or removed to meet demand, tailoring costs more precisely to meet demand.

Fee Settlement

In a virtual currency transaction in such an environment, several parties may be owed fees, such as licensing fees or service fees, during a transaction. The current system allows for the easy and organized settlement of such fees. For example, a central vendor may be owed a fee, a terminal or point of sale operator may be owed a fee, etc.

In a virtual currency transaction, such fees may be settled using any currency, for example fiat or a virtual currency.

In the current system, the operator terminals or points of sale may be associated with a virtual currency wallet address.

In one example, a transaction such as a purchase or sale of virtual currency in exchange for fiat currency may be carried out at a virtual currency terminal. In the example, a vendor may charge a fee of 1% of the transaction amount while the terminal owner and/or operator may have set a fee of 10% of the transaction amount.

Thus, in one example, when a transaction occurs for USD $100, a vendor may be owed a fee of USD $1.00. A virtual currency exchange may be queried at the time of the transaction to determine, for example, the exchange rate for the virtual currency. In one example, Bitcoin may be the virtual currency. If a virtual currency exchange is queried and it is determined that the exchange rate for Bitcoin is $10,000, then a $1.00 fee would be equal to $1.00/$10,000.00 Bitcoin, or 0.0001 Bitcoin, for example. This fee value may be stored in a database or datastore, for example. The fee may be charged immediately, or at a later point in time.

In one embodiment, the fee may be charged by a software service provider or vendor making a request to withdraw funds from the terminal operator's virtual currency wallet and deposit the funds into the vendor's virtual currency wallet.

Similarly, in one example, when a transaction occurs, a terminal's operator or owner may be owed a fee. The fee may be set or determined by the operator, using access to an account and through consoles as presented previously. The fees may be communicated to a core software service provider or vendor and updated in a database or datastore. The updated fees are used in the fee determinations and distributions.

In one example, a transaction such as a purchase or sale of virtual currency in exchange for fiat currency may be carried out at a virtual currency terminal. In the example, a vendor may charge a fee of 1% of the transaction amount while the terminal owner and/or operator may have set a fee of 10% of the transaction amount.

Thus, in one example, when a transaction occurs for USD $100, an operator may be owed a fee of USD $10.00. A virtual currency exchange may be queried at the time of the transaction to determine, for example, the exchange rate for the virtual currency. In one example, Bitcoin may be the virtual currency. If a virtual currency exchange is queried and it is determined that the exchange rate for Bitcoin is $10,000, then a $100.00 transaction amount would be equal to $100.00/$10,000.00 Bitcoin, or 0.01 Bitcoin, for example. Similarly, if a virtual currency exchange is queried and it is determined that the exchange rate for Bitcoin is $10,000, then a $10.00 fee amount would be equal to $10.00/$10,000.00 Bitcoin, or 0.001 Bitcoin, for example. Therefore, to purchase 0.01 Bitcoin, a customer may be required to deposit USD $110.00 at the given time.

In one embodiment, the operator fee may simply remain in the terminal as cash as profits. For the previous example, $10.00 remains in the terminal as cash profit.

In another example, a customer may request a cash withdrawal, in the example above wherein 1 Bitcoin is priced at $10,000 and the operator fee is 10%, then the customer may send 1 Bitcoin to the operator wallet address in exchange for withdrawing $9,000 USD in cash. The operator may dispose of the 0.1 Bitcoin profit in any manner, such as by selling for cash, keeping the virtual currency, or a combination of the two.

An example embodiment is provided:
A method, system, or computer readable medium storing instructions, for securely handling, by a software service provider, a virtual currency transaction between a customer and an operator of a point of sale, the method comprising:
creating a first user account for a first user, wherein creating the first user account comprises:
receiving, by the software service provider, first data wherein the first data comprises identification document information associated with the first user;
creating, by the software service provider, an account identifier for the first user;
storing, by the software service provider, in association with the first user account, the account identifier in a database or datastore;
receiving the virtual currency transaction request, the virtual currency transaction request triggered by the first customer at the point of sale;
wherein the point of sale comprises:
a hardware terminal including at least one processor, the at least one processor having a configuration to execute virtual currency transactions, the configuration including:
instructions for receiving virtual currency parameters;
instructions for transmitting at least some of the virtual currency parameters to the software service provider;
instructions for receiving and processing messages from the software service provider;
establishing a secure session between the software service provider and the point of sale;
wherein the secure session is established using at least a secure socket layer (SSL) or transport layer security (TLS) protocol;
wherein the secure session is established using a secured connection using a virtual private network (VPN).
performing a first processing of the virtual currency transaction, wherein performing the first processing of the virtual currency transaction comprises:
receiving, by the software service provider, an encrypted first payload;
wherein the encrypted first payload is produced by encrypting a first payload, the first payload produced by the point of sale, and wherein the first payload comprises a phone number, the phone number received from the first customer at the point of sale;
wherein the encrypted first payload communicated to the software service provider from the point of sale during the secure session using the secured connection; identifying, by the software service provider, an IP address associated with the VPN; allowing, by software service provider, traffic from the VPN based on the IP address; and decrypting, by the software service provider, the encrypted first payload;
sending, by the software service provider, an SMS verification code to the phone number;
performing a second processing of the virtual currency transaction, wherein performing the second processing of the virtual currency transaction comprises:
receiving, by the software service provider, an encrypted second payload;
wherein the encrypted second payload is produced by encrypting a second payload, the second payload produced by the point of sale, and wherein the second payload comprises at least some of the virtual currency parameters;
wherein the encrypted second payload communicated to the software service provider from the point of sale during the secure session using the secured connection; identifying, by the software service provider, the IP address associated with the VPN; allowing, by software service provider, traffic from the VPN based on the IP address; and decrypting, by the software service provider, the encrypted second payload;

identifying a first security factor associated with the first customer, wherein the identifying the first security factor associated with the first customer comprises:
the software service provider forwarding a first HTTP/HTTPS request to at least one of a set of third party service providers,
wherein the request is an age verification request, and wherein the first request comprises:
a third payload;
wherein the third payload comprises at least a portion of the first data;
the software service provider receiving a first third party response from at least one of the set of third party service providers;

performing a third processing of the virtual currency transaction, wherein performing the third processing of the virtual currency transaction comprises:
receiving, by the software service provider, an encrypted fourth payload;
wherein the encrypted fourth payload is produced by encrypting a fourth payload, the fourth payload produced by the point of sale, and wherein the fourth payload comprises at least second data including at least a virtual currency wallet address associated with the first customer;
wherein the encrypted fourth payload communicated to the software service provider from the point of sale during the secure session using the secured connection; identifying, by the software service provider, the IP address associated with the VPN; allowing, by software service provider, traffic from the VPN based on the IP address; and decrypting, by the software service provider, the encrypted fourth payload;

identifying a second security factor associated with the first customer, wherein the identifying the second security factor associated with the first customer comprises:
the software service provider forwarding a second HTTP or HTTPS request to at least one of the set of third party service providers, wherein the second request comprises:
at least a risk analysis; and
a fifth payload;
wherein the fifth payload comprises at least a portion of the second data;
receiving a second third party response associated with the virtual currency wallet address from at least one of the set of third party service providers;

identifying a facial recognition factor associated with the first customer, wherein the identifying the facial recognition factor associated with the first customer comprises:
receiving, by the software service provider, an encrypted sixth payload;
wherein the encrypted sixth payload is produced by encrypting a sixth payload, the sixth payload produced by the point of sale, and wherein the sixth payload comprises at least one parameter associated with image or video data associated with the first customer's face;
wherein the encrypted sixth payload communicated to the software service provider from the point of sale during the secure session using the secured connection; identifying, by the software service provider, the IP address associated with the VPN; allowing, by software service provider, traffic from the VPN based on the IP address; and decrypting, by the software service provider, the encrypted sixth payload;

determining, by the software service provider, a risk level associated with the user based on the first risk factor and the second risk factor;

in response to determining that the risk level is less than a threshold risk level or equal to an acceptable risk level:
sending, by the software service provider, an encrypted seventh payload;
wherein the encrypted seventh payload is produced by encrypting a seventh payload, the seventh payload produced by the software service provider, and wherein the seventh payload comprises at least a message to the point of sale to allow a completing of the transaction;
wherein the encrypted seventh payload communicated to the point of sale from the software service provider during the secure session using the secured connection;

logging the transaction details in a data storage by the software service provider, wherein the logging comprises at least:
storing, in association with the account, a transaction amount;
storing, in association with the account, a transaction date or time;
storing, in association with the account, the IP address associated with the transaction; and
storing, in association with the account, the virtual currency wallet address.

Advantages

Many advantages arise over previous systems in the described embodiments, for example.

First, the described embodiments provide an adaptive and more robust security environment. For example, several factors for customers at a terminal, for example, are determined and leveraged. The combination of factors creates a *nexus* of confidence (or lack thereof) around a user.

Next, the piecemeal nature of requests/responses in certain embodiments between a node and central service allows for a machine state to be constantly known, stored, etc by the central service. Thus, data is not easily lost or tampered with, for example, at the client or terminal.

Next, a connection interrupt between a hardware terminal, for example, has less impact on the security in the described embodiments. As described above, the machine state may be known or saved by the central service, and therefore it may be easily and securely restored, etc.

Next, in the described embodiments, the services are easily scalable and the security services are easily modified and quickly implemented system-wide. This is because changes may be simply implemented in the central software services which are immediately used by some or all nodes or terminals. Thus, hardware, terminal, or client side changes are minimized.

Next, in the described embodiments, a central service can easily leverage and implement services such as security services from third parties. New specialized services are constantly being created and made available, and easily connecting, interacting, and quickly implementing these services is highly advantageous. Since security often relies on quickly evolving against new threats, speed of implementation of new defenses is of great value and importance.

Next, as provided previously, in some embodiments such as the above federated facial recognition systems are additionally advantageous since some or all of the system can function offline. Round-trip to server and processing time is also reduced, creating a lower latency for the end user.

Environment

The present invention may be a system, an apparatus, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages, and/or scripting languages, PHP, Python, JavaScript, or the like. The computer readable program instructions may execute entirely on the user's device, partly on the user's device, as a stand-alone software package, partly on the user's device and partly on a remote device or entirely on the remote device or server. In the latter scenario, the remote device may be connected to the user's device through any type of network, including a local area network (LAN) or a wide area network (WAN), or the connection may be made to an external device (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

What is claimed is:

1. A method for biometric authentication and securely handling, by a software service provider, a first operation of a hardware terminal by a first visitor, the method comprising:
   establishing a secure session between the software service provider and the hardware terminal;
   performing a first processing of the first operation, wherein performing the first processing of the first operation comprises:
      receiving, by the software service provider, an encrypted first payload;

wherein the encrypted first payload is produced by encrypting a first payload, the first payload produced by the hardware terminal;
wherein the encrypted first payload is communicated to the software service provider from the hardware terminal during the secure session using the secured connection;
performing a second processing of the first operation, wherein performing the second processing of the first operation comprises:
receiving, by the software service provider, an encrypted second payload;
wherein the encrypted second payload is produced by encrypting a second payload, the second payload produced by the hardware terminal;
wherein the encrypted second payload is communicated to the software service provider from the hardware terminal during the secure session using the secured connection;
identifying a first security factor associated with the first visitor, wherein the identifying the first security factor associated with the first visitor comprises:
the software service provider forwarding a first HTTP/HTTPS request to at least one of a set of third party service providers,
wherein the request is an age verification request, and wherein the first request comprises:
a third payload;
wherein the third payload comprises at least a portion of the first data;
the software service provider receiving a first third party response from at least one of the set of third party service providers;
performing a third processing of the first operation, wherein performing the third processing of the first operation comprises:
receiving, by the software service provider, an encrypted fourth payload;
wherein the encrypted fourth payload is produced by encrypting a fourth payload, the fourth payload produced by the hardware terminal, and wherein the fourth payload comprises at least second data;
wherein the encrypted fourth payload is communicated to the software service provider from the hardware terminal during the secure session using the secured connection;
identifying, by the software service provider, an IP address associated with a VPN;
allowing, by software service provider, traffic from the VPN based on the IP address; and
decrypting, by the software service provider, the encrypted fourth payload;
identifying a second security factor associated with the first visitor;
identifying a facial recognition factor associated with the first visitor, wherein the facial recognition factor is different from the first security factor and the second security factor; and
logging, by the software service provider, details of the first operation in the at least one database or datastore.

2. The method of claim 1, further comprising:
wherein the hardware terminal comprises a terminal capable of virtual currency transactions.

3. The method of claim 1, further comprising:
wherein the hardware terminal is a combination ATM and virtual currency transaction terminal.

4. The method of claim 1, further comprising:
wherein the identifying the second security factor associated with the first visitor comprises:
the software service provider forwarding a second HTTP or HTTPS request to at least one of the set of third party service providers, wherein the second request comprises:
a fifth payload;
wherein the fifth payload comprises at least a portion of the second data;
receiving a second third party response from at least one of the set of third party service providers.

5. The method of claim 4, further comprising:
wherein the identifying the facial recognition factor associated with the first visitor comprises:
receiving, by the software service provider, an encrypted sixth payload;
wherein the encrypted sixth payload is produced by encrypting a sixth payload, the sixth payload produced by the hardware terminal, and wherein the sixth payload comprises at least one parameter associated with image or video data associated with the first visitor's face;
wherein the encrypted sixth payload is communicated to the software service provider from the hardware terminal during the secure session using the secured connection;
identifying, by the software service provider, the IP address associated with the VPN;
allowing, by software service provider, traffic from the VPN based on the IP address; and
decrypting, by the software service provider, the encrypted sixth payload.

6. The method of claim 5, further comprising:
determining, by the software service provider, a score associated with the first visitor based on the first factor and the second factor;
in response to determining that the score is less than a threshold score or equal to an acceptable score:
sending, by the software service provider, an encrypted seventh payload to the hardware terminal;
wherein the encrypted seventh payload is produced by encrypting a seventh payload, the seventh payload produced by the software service provider, and wherein the seventh payload comprises at least a message to allow a completing of the first operation;
wherein the encrypted seventh payload is communicated to the hardware terminal from the software service provider during the secure session using the secured connection.

7. The method of claim 6, further comprising:
wherein the logging comprises at least:
storing, in association with the account, an operation parameter;
storing, in association with the account, an operation date or time; and
storing, in association with the account, the IP address associated with the first operation.

8. A system comprising:
one or more web servers comprising:
one or more processors;
one or more databases or datastores;
one or more non-transitory computer readable media storing instructions;

the system to execute a method for biometric authentication and securely handling, by a software service provider, a first operation of a hardware terminal by a first visitor, the method comprising:
- establishing a secure session between the software service provider and the hardware terminal;
- performing a first processing of the first operation, wherein performing the first processing of the first operation comprises:
  - receiving, by the software service provider, an encrypted first payload;
    - wherein the encrypted first payload is produced by encrypting a first payload, the first payload produced by the hardware terminal;
    - wherein the encrypted first payload is communicated to the software service provider from the hardware terminal during the secure session using the secured connection;
- performing a second processing of the first operation, wherein performing the second processing of the first operation comprises:
  - receiving, by the software service provider, an encrypted second payload;
    - wherein the encrypted second payload is produced by encrypting a second payload, the second payload produced by the hardware terminal;
    - wherein the encrypted second payload is communicated to the software service provider from the hardware terminal during the secure session using the secured connection;
- identifying a first security factor associated with the first visitor, wherein the identifying the first security factor associated with the first visitor comprises:
  - the software service provider forwarding a first HTTP/HTTPS request to at least one of a set of third party service providers,
  - wherein the request is an age verification request, and wherein the first request comprises:
    - a third payload;
      - wherein the third payload comprises at least a portion of the first data;
  - the software service provider receiving a first third party response from at least one of the set of third party service providers;
- performing a third processing of the first operation, wherein performing the third processing of the first operation comprises:
  - receiving, by the software service provider, an encrypted fourth payload;
    - wherein the encrypted fourth payload is produced by encrypting a fourth payload, the fourth payload produced by the hardware terminal, and wherein the fourth payload comprises at least second data;
    - wherein the encrypted fourth payload is communicated to the software service provider from the hardware terminal during the secure session using the secured connection;
  - identifying, by the software service provider, an IP address associated with a VPN;
  - allowing, by software service provider, traffic from the VPN based on the IP address; and
  - decrypting, by the software service provider, the encrypted fourth payload;
- identifying a second security factor associated with the first visitor;
- identifying a facial recognition factor associated with the first visitor, wherein the facial recognition factor is different from the first security factor and the second security factor; and
- logging, by the software service provider, details of the first operation in the at least one database or datastore.

9. The system of claim 8, further comprising:
wherein the hardware terminal comprises a terminal capable of virtual currency transactions.

10. The system of claim 8, further comprising:
wherein the hardware terminal comprises a terminal capable of both virtual currency transactions and fiat or cash transactions.

11. The system of claim 8, further comprising:
wherein the identifying the second security factor associated with the first visitor comprises:
the software service provider forwarding a second HTTP or HTTPS request to at least one of the set of third party service providers, wherein the second request comprises:
a fifth payload;
wherein the fifth payload comprises at least a portion of the second data;
receiving a second third party response from at least one of the set of third party service providers.

12. The system of claim 11, further comprising:
wherein the identifying the facial recognition factor associated with the first visitor comprises:
receiving, by the software service provider, an encrypted sixth payload;
wherein the encrypted sixth payload is produced by encrypting a sixth payload, the sixth payload produced by the hardware terminal, and wherein the sixth payload comprises at least one parameter associated with image or video data associated with the first visitor's face;
wherein the encrypted sixth payload is communicated to the software service provider from the hardware terminal during the secure session using the secured connection;
identifying, by the software service provider, the IP address associated with the VPN;
allowing, by software service provider, traffic from the VPN based on the IP address; and
decrypting, by the software service provider, the encrypted sixth payload.

13. The system of claim 12, further comprising:
determining, by the software service provider, a score associated with the first visitor based on the first factor and the second factor;
in response to determining that the score is less than a threshold score or equal to an acceptable score:
sending, by the software service provider, an encrypted seventh payload to the hardware terminal;
wherein the encrypted seventh payload is produced by encrypting a seventh payload, the seventh payload produced by the software service provider, and wherein the seventh payload comprises at least a message to allow a completing of the first operation;
wherein the encrypted seventh payload is communicated to the hardware terminal from the software service provider during the secure session using the secured connection.

14. The system of claim 13, further comprising:
wherein the logging comprises at least:
storing, in association with the account, an operation parameter;
storing, in association with the account, an operation date or time; and
storing, in association with the account, the IP address associated with the first operation.

15. One or more non-transitory computer readable media storing instructions that, when executed, cause one or more processors to perform a method for handling a first operation of a hardware terminal by a first visitor, the method comprising:
establishing a secure session between the software service provider and the hardware terminal;
performing a first processing of the first operation, wherein performing the first processing of the first operation comprises:
receiving, by the software service provider, an encrypted first payload;
wherein the encrypted first payload is produced by encrypting a first payload, the first payload produced by the hardware terminal;
wherein the encrypted first payload is communicated to the software service provider from the hardware terminal during the secure session using the secured connection;
performing a second processing of the first operation, wherein performing the second processing of the first operation comprises:
receiving, by the software service provider, an encrypted second payload;
wherein the encrypted second payload is produced by encrypting a second payload, the second payload produced by the hardware terminal;
wherein the encrypted second payload is communicated to the software service provider from the hardware terminal during the secure session using the secured connection;
identifying a first security factor associated with the first visitor, wherein the identifying the first security factor associated with the first visitor comprises:
the software service provider forwarding a first HTTP/HTTPS request to at least one of a set of third party service providers,
wherein the request is an age verification request, and wherein the first request comprises:
a third payload;
wherein the third payload comprises at least a portion of the first data;
the software service provider receiving a first third party response from at least one of the set of third party service providers;
performing a third processing of the first operation, wherein performing the third processing of the first operation comprises:
receiving, by the software service provider, an encrypted fourth payload;
wherein the encrypted fourth payload is produced by encrypting a fourth payload, the fourth payload produced by the hardware terminal, and wherein the fourth payload comprises at least second data;
wherein the encrypted fourth payload is communicated to the software service provider from the hardware terminal during the secure session using the secured connection;
identifying by the software service provider, an IP address associated with a VPN;
allowing, by software service provider, traffic from the VPN based on the IP address; and
decrypting, by the software service provider, the encrypted fourth payload;
identifying a second security factor associated with the first visitor;
identifying a facial recognition factor associated with the first visitor, wherein the facial recognition factor is different from the first security factor and the second security factor; and
logging, by the software service provider, details of the first operation in the at least one database or datastore.

16. The one or more non-transitory computer readable media of claim 15, storing instructions that, when executed, cause one or more processors to perform a method for handling a first operation of a hardware terminal by a first visitor, the method further comprising:
wherein the hardware terminal comprises a terminal capable of virtual currency transactions.

17. The one or more non-transitory computer readable media of claim 15, storing instructions that, when executed, cause one or more processors to perform a method for handling a first operation of a hardware terminal by a first visitor, the method further comprising:
wherein the hardware terminal comprises a terminal capable of both virtual currency transactions and fiat or cash transactions.

18. The one or more non-transitory computer readable media of claim 15, storing instructions that, when executed, cause one or more processors to perform a method for handling a first operation of a hardware terminal by a first visitor, the method further comprising:
wherein the identifying the second security factor associated with the first visitor comprises:
the software service provider forwarding a second HTTP or HTTPS request to at least one of the set of third party service providers, wherein the second request comprises:
a fifth payload;
wherein the fifth payload comprises at least a portion of the second data;
receiving a second third party response from at least one of the set of third party service providers.

19. The one or more non-transitory computer readable media of claim 18, storing instructions that, when executed, cause one or more processors to perform a method for handling a first operation of a hardware terminal by a first visitor, the method farther comprising:
determining, by the software service provider, a score associated with the first visitor based on the first factor and the second factor;
in response to determining that the score is less than a threshold score or equal to an acceptable score:
sending, by the software service provider, an encrypted seventh payload to the hardware terminal;
wherein the encrypted seventh payload is produced by encrypting a seventh payload, the seventh payload produced by the software service provider, and wherein the seventh payload comprises at least a message to allow a completing of the first operation;
wherein the encrypted seventh payload is communicated to the hardware terminal from the software service provider during the secure session using the secured connection.

20. The one or more non-transitory computer readable media of claim 19, storing instructions that, when executed, cause one or more processors to perform a method for handling a first operation of a hardware terminal by a first visitor, the method further comprising:
- determining, by the software service provider, a score associated with the first visitor based on the first factor and the second factor;
- in response to determining that the score is less than a threshold score or equal to an acceptable score:
  - sending, by the software service provider, an encrypted seventh payload to the hardware terminal;
    - wherein the encrypted seventh payload is produced by encrypting a seventh payload, the seventh payload produced by the software service provider, and wherein the seventh payload comprises at least a message to allow a completing of the operation;
    - wherein the encrypted seventh payload is communicated to the hardware terminal from the software service provider during the secure session using the secured connection;
- wherein the logging comprises at least:
  - storing, in association with the account, an operation parameter;
  - storing, in association with the account, an operation date or time; and
  - storing, in association with the account, the IP address associated with the first operation.

* * * * *